US010968297B2

United States Patent
Krasovskiy et al.

(10) Patent No.: US 10,968,297 B2
(45) Date of Patent: Apr. 6, 2021

(54) THIOUREA GROUP IV TRANSITION METAL CATALYSTS AND POLYMERIZATION SYSTEMS

(71) Applicant: Dow Global Technologies LLC, Midland, MI (US)

(72) Inventors: Arkady L. Krasovskiy, Lake Jackson, TX (US); Endre Szuromi, Richmond, TX (US)

(73) Assignee: Dow Global Technologies LLC, Midland, MI (US)

( * ) Notice: Subject to any disclaimer, the term of this patent is extended or adjusted under 35 U.S.C. 154(b) by 134 days.

(21) Appl. No.: 16/333,049

(22) PCT Filed: Sep. 13, 2017

(86) PCT No.: PCT/US2017/051292
§ 371 (c)(1),
(2) Date: Mar. 13, 2019

(87) PCT Pub. No.: WO2018/063799
PCT Pub. Date: Apr. 5, 2018

(65) Prior Publication Data
US 2019/0202950 A1    Jul. 4, 2019

Related U.S. Application Data

(60) Provisional application No. 62/402,200, filed on Sep. 30, 2016.

(51) Int. Cl.
C07C 335/00    (2006.01)
C07C 335/04    (2006.01)
C08F 210/16    (2006.01)
C07F 7/00    (2006.01)

(52) U.S. Cl.
CPC ............ *C08F 210/16* (2013.01); *C07F 7/003* (2013.01); *C08F 2800/10* (2013.01); *C08F 2800/20* (2013.01)

(58) Field of Classification Search
CPC .......................... C07C 335/00; C07C 335/04
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,613,484 A | 9/1986 | Ayres et al. |
| 4,882,400 A | 11/1989 | Dumain et al. |
| 5,352,749 A | 10/1994 | DeChellis et al. |

(Continued)

FOREIGN PATENT DOCUMENTS

| | | |
|---|---|---|
| BE | 839380 | 10/1976 |
| EP | 0802202 A1 | 10/1997 |

(Continued)

OTHER PUBLICATIONS

Office Action dated Oct. 8, 2019 pertaining to U.S. Appl. No. 16/333,071, filed Mar. 13, 2019, 10 pgs.
Crust et al., "Diazaallyls of Group 4 Metals Based on trans-1,2-diaminocyclohexane", Journal of Organometallic Chemistry, 2005, 3373-3382.
International Search Report and Written Opinion pertaining to PCT/US2017/051535, dated Nov. 20, 2017.
International Preliminary Report on Patentability pertaining to PCT/US2017/051535, dated Apr. 2, 2019.
Takashima et al., "Synthesis of Group 4 Transition Metal Complexes Bearing 2-pyridinethiolate Ligands and their Catalytic Activities for Ethylene Polymerization," Polymer, Elsevier Science Publishers B.V., GB, Jul. 26, 2006,vol. 47, No. 16 (pp. 5762-5774).

(Continued)

*Primary Examiner* — Catherine S Branch
(74) *Attorney, Agent, or Firm* — Dinsmore & Shohl LLP

(57) ABSTRACT

Catalyst compositions and polymerization systems include at least one thiourea complex according to Formula (I): $MQ_aX_{4-a}$ (I) in which M is Ti, Zr, or Hf; a is 1 or 2; each group Q of the thiourea complex is a bidentate thiourea ligand bound to the metal center and having Formula (Ia), Formula (Ib), or Formula (Ic): (Formulas should be inserted here). In Formulas (Ia), (Ib), and (Ic), each group $R^1$, $R^2$, and $R^3$ is independently chosen from alkyl groups or aryl groups; each group $Z^1$ or $Z^2$ is independently chosen from alkylene groups. If a=2, groups $R^1$ of the two groups Q are optionally linked, or groups $R^3$ of the two groups Q are optionally linked. Each X is covalently bonded or coordinated to the metal center and is independently chosen from alkyl groups or halides. The polymerization systems may be configured to copolymerize ethylene and α-olefins.

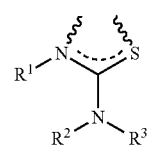

(Ia)

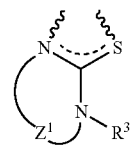

(Ib)

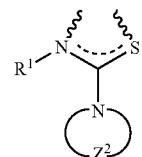

(Ic)

20 Claims, No Drawings

(56) References Cited

U.S. PATENT DOCUMENTS 5,541,270 A 7/1996 Chinh et al.
2011/0207903 A1 8/2011 Fontaine et al.

FOREIGN PATENT DOCUMENTS

EP 1749842 A1 2/2007
WO 2004041796 A1 5/2004

OTHER PUBLICATIONS

Aragon et al., "Synthesis, Structure and Reactivity in Styrene Polymerization by Heterocyclic Alkoky- and Thiolatotitanium (IV) Complexes," European Journal of Inorganic Chemistry—Chemisch Berichte, Mar. 1, 2006, vol. 2006, No. 5 (pp. 965-971).
International Search Report and Written Opinion dated Nov. 20, 2017 for PCT/US2017/051292 filed Sep. 13, 2017 (pp. 1-14).
International Preliminary Report on Patentability dated Apr. 11, 2019 for PCT/US2017/051292 filed Sep. 13, 2017 (pp. 1-8).
Notice of Allowance and Fee(s) Due dated Jan. 22, 2020 pertaining to U.S. Appl. No. 16/333,071, filed Mar. 13, 2019, 8 pgs.

THIOUREA GROUP IV TRANSITION METAL CATALYSTS AND POLYMERIZATION SYSTEMS

CROSS REFERENCE TO RELATED APPLICATIONS

This application claims priority to U.S. Provisional Patent Application Ser. No. 62/402,200 filed Sep. 30, 2016, which is incorporated by reference in its entirety.

BACKGROUND

Field

The present specification generally relates to transition-metal catalysts and, more specifically, to thiourea group IV transition metal catalysts for polymerization reactions, including the synthesis of ethylene/α-olefin copolymers.

Technical Background

Olefin based polymers are utilized in the manufacture of a variety of articles and products, and thus, there is a high industrial demand for such polymers. Olefin based polymers, such as polyethylene and/or polypropylene, are produced via various catalyst systems. Selection of such catalyst systems used in the polymerization process is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in solution phase polymerization process, gas phase polymerization process, and/or slurry phase polymerization process in one or more reactors, for example, connected in series or parallel, in the presence of one or more catalyst systems.

Despite the research efforts in developing catalyst systems suitable for polyolefin polymerization, such as polyethylene, there is still a need for improved polymerization catalysts to meet industrial demand for olefin based polymers.

SUMMARY

Accordingly, the present embodiments are directed to catalyst systems, which provide alternative synthetic schemes for meeting industrial demand of olefin based polymers.

According to some embodiments, compositions or catalytic compositions include at least one thiourea complex according to the Formula (I):

$$MQ_aX_{4-a} \quad (I)$$

in which M is Ti, Zr, or Hf; a is 1 or 2; each group X is covalently bonded or coordinated to the metal center and is independently chosen from alkyl groups, halides, or amides; and each group Q of the thiourea complex is a bidentate thiourea ligand bound to the metal center and independently chosen from groups having Formula (Ia), Formula (Ib), or Formula (Ic):

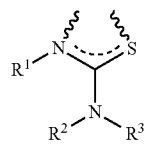

(Ia)

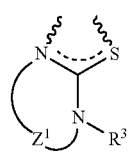

(Ib)

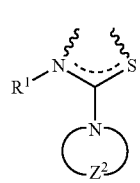

(Ic)

In Formulas (Ia), (Ib), and (Ic), each group $R^1$, $R^2$, and $R^3$ is independently chosen from alkyl groups or aryl groups; and each group $Z^1$ or $Z^2$ is independently chosen from alkylene groups. Thus, if a=2, the two groups Q of the thiourea complex of Formula (I) may be the same or different. If a=2, groups $R^1$ of the two groups Q are optionally linked to each other through at least one covalent bond, or groups $R^3$ of the two groups Q are optionally linked to each other through at least one covalent bond. The polymerization systems may be configured to copolymerize ethylene and α-olefins.

According to some embodiments, the at least one thiourea complex according to the Formula (I) has Formula (IIa), Formula (IIb), or Formula (IIc):

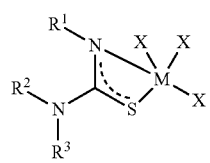

(IIa)

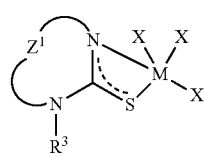

(IIb)

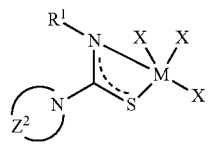

(IIc)

where M, $R^1$, $R^2$, $R^3$, $Z^1$, $Z^2$, and X are as defined in Formula (I). Each group X in complexes of Formula (IIa), Formula (IIb), or Formula (IIc) may be the same or different.

According to some embodiments, the at least one thiourea complex according to the Formula (I) has Formula (IIIa), Formula (IIIb), Formula (IIIc), Formula (IIId), Formula (IIIe), or Formula (IIIf):

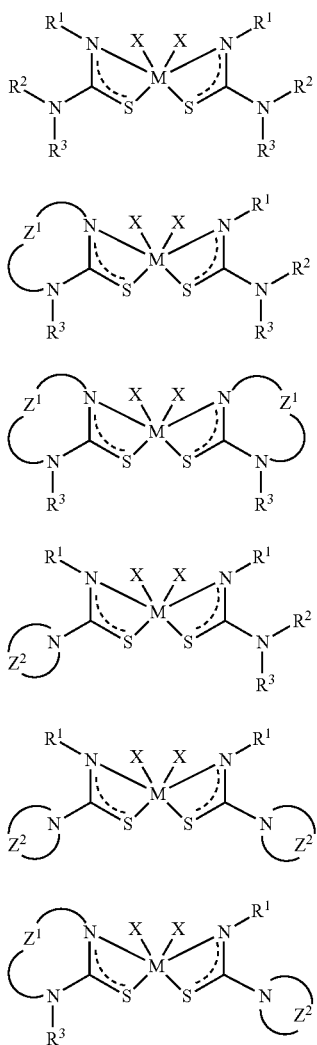

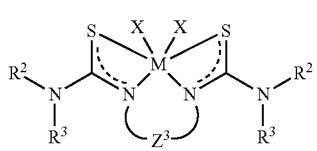

where M, R[1], R[2], R[3], Z[1], Z[2], and X are as defined in Formula (I). The two groups R[1] in complexes of Formula (IIIa), Formula (IIId), or Formula (IIIe) may be the same or different. The two groups R[2] of complexes of Formula (IIIa) may be the same or different. The two groups R[3] in complexes of Formula (IIIa), Formula (IIIb), Formula (IIIc) may be the same or different. The two groups Z[1] in complexes of Formula (IIIc) may be the same or different. The two groups Z[2] in complexes of Formula (IIIe) may be the same or different. The two groups X in complexes of any of Formulas (IIIa)-(IIIf) may be the same or different.

According to some embodiments, the at least one thiourea complex according to the Formula (I) has Formula (IVa), Formula (IVb), or Formula (IVc):

where M, R[2], R[3], Z[2], and X are as defined in Formula (I); and Z[3] is an alkylene group formed from the joining of two groups R[1] as defined in Formula (I) through at least one covalent bond. The two groups R[2] in complexes of Formula (IVa) may be the same or different. The two groups R[3] in complexes of Formula (IVa) may be the same or different. The two groups Z[2] in complexes of Formula (IVc) may be the same or different. The two groups X in complexes of any of Formulas (IVa)-(IVc) may be the same or different.

According to some embodiments, the at least one thiourea complex according to the Formula (I) has Formula (Va), Formula (Vb), or Formula (Vc):

where M, R[1], R[2], Z[1], and X are as defined in Formula (I); and Z[4] is an alkylene group formed from the joining of two groups R[3] as defined in Formula (I) through at least one covalent bond. The two groups R[1] in complexes of Formula (Va) may be the same or different. The two groups R[2] in complexes of Formula (Va) may be the same or different. The two groups Z[1] in complexes of Formula (Vc) may be the same or different. The two groups X in complexes of any of Formulas (Va)-(Vc) may be the same or different.

Further embodiments are directed to polymerization systems configured to copolymerize ethylene and an α-olefin comonomer in the presence of a catalytic amount of compositions that include at least one thiourea complex according to at least one embodiment of this disclosure.

Further embodiments are directed to ethylene-co-alkylene copolymers produced from a polymerization system in which a catalytic amount of a composition containing at least one thiourea complex according to at least one embodiment of this disclosure is present during polymerization of ethylene and an α-olefin.

Further embodiments are directed to polymerization methods including reacting ethylene and an α-olefin comonomer in the presence of a catalytic amount of a composition containing at least one thiourea complex according to at least one embodiment of this disclosure to form an ethylene-co-alkylene copolymer. In some embodiments, the α-olefin comonomer may include at least one $C_3$-$C_{12}$ α-olefin such as, for example, 1-octene.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Definitions

Common abbreviations used in this disclosure may include Me: methyl; Et: ethyl; Ph: phenyl; Bn: benzyl (—CH$_2$-Ph); THF: tetrahydrofuran; Et$_2$O: diethyl ether; C$_6$D$_6$: deuterated benzene; CDCl$_3$: deuterated chloroform; DMSO-d$_6$: deuterated dimethylsulfoxide; ZrBn$_4$: zirconium (IV) tetrabenzyl; HfBn$_4$: hafnium(IV) tetrabenzyl; N$_2$: nitrogen gas; MMAO: modified methylaluminoxane; NMR: nuclear magnetic resonance; DSC: differential scanning calorimetry; mmol: millimoles; mL: milliliters; M: molar; min: minutes; h: hours; d: days; GPC: gel permeation chromatography; M$_w$: weight average molecular weight; M$_n$: number average molecular weight.

The term "independently selected" is used herein to indicate that the R groups, such as, $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not limit, the definitions known to those of skill in the art.

The terms "moiety," "functional group," or "group," may be used interchangeably in this specification, but those of skill in the art may recognize certain parts of a complex or compound as being a moiety rather than a functional group and vice versa. Additionally, the term "moiety" includes functional groups and/or discrete bonded residues that are present in the compounds or metal complexes of this disclosure. The term "moiety" as used in the present application is inclusive of individual units in the copolymers or the individual units within a polymeric ligand, as described in the general formulas of the present disclosure.

The term "complex" means a metal and ligand coordinated together to form a single molecular compound. The coordination may be formed through dative or covalent bonds. For the purposes of illustration, certain representative groups are defined within this disclosure. These definitions are intended to supplement and illustrate, not limit, the definitions known to those of skill in the art.

The term "aliphatic" encompasses the terms "alkyl," "branching alkyl," "($C_1$-$C_{40}$)hydrocarbyls," "substituted ($C_1$-$C_{40}$)hydrocarbyls," "($C_3$-$C_{40}$)hydrocarbylene," and "substituted ($C_3$-$C_{40}$)hydrocarbylene."

The term "heteroaliphatic" includes "($C_1$-$C_{40}$)heterohydrocarbyls," and "substituted ($C_1$-$C_{40}$)heterohydrocarbyls," "[(C+Si)$_3$-(C+Si)$_{40}$]organosilylene," "substituted [(C+Si)$_3$—(C+Si)$_{40}$]organosilylene," "[(C+Ge)$_3$-(C+Ge)$_{40}$]organogermylene," and substituted [(C+Ge)$_3$-(C+Ge)$_{40}$]organogermylene."

The term "aromatic" or "aryl" encompasses the terms: "($C_6$-$C_{40}$)aryl" and "substituted ($C_6$-$C_{40}$)aryl group." The term "heteroaromatic" includes "($C_1$-$C_{40}$)heteroaryl," and "($C_2$-$C_{40}$)heteroaryl."

When used to describe certain carbon atom-containing chemical groups (e.g., ($C_1$-$C_{40}$)alkyl), the parenthetical expression ($C_1$-$C_{40}$) can be represented by the form "($C_x$-$C_y$)," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted ($C_1$-$C_{40}$)alkyl contains from 1 to 40 carbon atoms (x=1 and y=40). When the chemical group is substituted by one or more carbon atom-containing $R^S$ substituents, the substituted ($C_x$-$C_y$) chemical group may comprise more than y total carbon atoms; i.e., the total number of carbon atoms of the carbon atom-containing substituent(s)-substituted ($C_x$-$C_y$) chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g. $R^1$, $R^2$, $R^3$) of the compounds and metal complex of the general formulas in this disclosure may be unsubstituted, that is, can be defined without use of a substituent $R^S$, provided the above-mentioned conditions are satisfied. In other embodiments, at least one of the chemical groups of the compounds and metal complexes of the general formulas of this disclosure independently contain one or more of the substituents $R^S$. When a compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$). The $(C_1-C_{18})$alkylene and $(C_1-C_8)$alkylene substituents are especially useful for forming substituted chemical groups that are bicyclic or tricyclic analogs, as the case may be, of corresponding monocyclic or bicyclic unsubstituted chemical groups.

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene, organosilylene, organogermylene are intended to include every possible stereoisomer.

Heteroalkyl and heteroalkylene groups are saturated straight or branched chain radicals or diradicals, respectively, containing $(C_1-C_{40})$carbon atoms, and one or more of the heteroatoms or heteroatomic groups O; S; N; S(O); $S(O)_2$; $S(O)_2N$; $Si(R^C)_2$; $Ge(R^C)_2$; $P(R^C)$; $P(O)(R^C)$; and $N(R^C)$, as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In some embodiments, $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In further embodiments, each of the aforementioned $(C_1-C_{40})$hydrocarbyl groups independently has a maximum of 20 carbon atoms (i.e., $(C_1-C_{20})$hydrocarbyl), and in other embodiments, a maximum of 15 carbon atoms.

The term "$(C_1-C_{40})$alkyl" means a saturated straight or branched hydrocarbon radical of from 1 to 40 carbon atoms, that is unsubstituted or substituted by one or more $R^S$. Examples of unsubstituted $(C_1-C_{40})$alkyl include unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 2,2-dimethylpropyl; 1-butyl; 2-butyl; 2-methylpropyl; 1,1-dimethylethyl; 1-pentyl; 1-hexyl; 2-ethylhexyl; 1-heptyl; 1-nonyl; 1-decyl; 2,2,4-trimethylpentyl. Examples of substituted $(C_1-C_{40})$alkyl include substituted $(C_1-C_{20})$alkyl; substituted $(C_1-C_{10})$alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl)silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl include unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl include substituted $(C_6-C_{20})$aryl; substituted $(C_6-C_1)$aryl; 2,6-bis[$(C_1-C_{20})$alkyl]-phenyl; 2-$(C_1-C_8)$alkyl-phenyl; 2,6-bis$(C_1-C_8)$alkyl-phenyl; 2,4,6-tris$(C_1-C_8)$alkyl-phenyl; polyfluorophenyl; pentafluorophenyl; 2,6-dimethylphenyl, 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "$(C_3-C_{40})$cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl include unsubstituted $(C_3-C_{20})$cycloalkyl, unsubstituted $(C_3-C_{10})$cycloalkyl; cyclopropyl; cyclobutyl; cyclopentyl; cyclohexyl; cycloheptyl; cyclooctyl; cyclononyl; cyclodecyl; octahydroindenyl; bicyclo[4.4.0]decyl; bicyclo[2.2.1]heptyl; and tricyclo[3.3.1.1]decyl. Examples of substituted $(C_3-C_{40})$cycloalkyl include substituted $(C_3-C_{20})$cycloalkyl; substituted $(C_3-C_{10})$cycloalkyl; 2-methylcyclohexyl; and perfluorocyclohexyl.

Examples of $(C_1-C_{40})$hydrocarbylene include unsubstituted or substituted $(C_3-C_{40})$hydrocarbylene; $(C_6-C_{40})$arylene, $(C_3-C_{40})$cycloalkylene, and $(C_3-C_{40})$alkylene (e.g., $(C_3-C_{20})$alkylene). In some embodiments, the diradicals are on the terminal atoms of the hydrocarbylene as in a 1,3-alpha, omega diradical (e.g., $-CH_2CH_2CH_2-$) or a 1,5-alpha, omega diradical with internal substitution (e.g., $-CH_2CH_2CH(CH_3)CH_2CH_2-$). In other embodiments, the diradicals are on the non-terminal atoms of the hydrocarbylene as in a $C_7$ 2,6-diradical

(e.g., $CH_3\overset{|}{C}HCH_2CH_2CH_2\overset{|}{C}HCH_3$)

or a $C_7$ 2,6-diradical with internal substitution

(e.g., $CH_3\overset{|}{C}HCH_2CH(CH_3)CH_2\overset{|}{C}HCH_3$).

The terms $[(C+Si)_3-(C+Si)_{40}]$ organosilylene and $[(C+Ge)_3-(C+Ge)_{40}]$ organogermylene are defined as diradicals in which the two radical bearing atoms of the diradical unit are spaced apart by one or more intervening carbon, silicon and/or germanium atoms. Such $[(C+Si)_3-(C+Si)_{40}]$ organosilylene and $[(C+Ge)_3-(C+Ge)_{40}]$ organogermylene groups can be substituted or unsubstituted. In some embodiments the diradicals are on the terminal atoms of the organosilylene or organogermylene as in a 1,5-α,ω-diradical (e.g. $-CH_2CH_2Si(C_2H_5)_2CH_2CHCH_2-$ and $-CH_2CH_2Ge(C_2H_5)_2CH_2CH_2-$). In other embodiments, the diradicals are on the non-terminal atoms of the organosilylene or organogermylene as in a substituted $(C+Si)_7$ 2,6-diradical

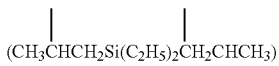

and a substituted $(C+Ge)_7$ 2,6-diradical

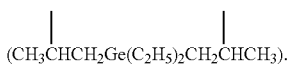

The term "$(C_1-C_{40})$alkylene" means a saturated or unsaturated straight chain or branched chain diradical of from 1 to 40 carbon atoms that is unsubstituted or substituted by one or more $R^S$. Examples of unsubstituted $(C_1-C_{40})$alkylene include unsubstituted $(C_3-C_{20})$alkylene, including unsubstituted 1,3-$(C_3-C_{10})$alkylene; 1,4-$(C_4-C_{10})$alkylene; —$(CH_2)_3$—; —$(CH_2)_4$—; —$(CH_2)_5$—; —$(CH_2)_6$—; —$(CH_2)_7$—; —$(CH_2)_8$—; and —$(CH_2)_4CH(CH_3)$—. Examples of substituted $(C_1-C_{40})$alkylene include substituted $(C_3-C_{20})$alkylene; —$CF_2CF_2CF_2$—; and —$(CH_2)_{14}C(CH_3)_2(CH_2)_5$— (i.e., a 6,6-dimethyl substituted normal-1,20-eicosylene). As mentioned previously, two $R^S$ may be taken together to form a $(C_1-C_{40})$alkylene. Thus, examples of substituted $(C_1-C_{40})$alkylene also include 1,2-bis(methylene)cyclopentane; 1,2-bis(methylene)cyclohexane; 2,3-bis(methylene)-7,7-dimethyl-bicyclo[2.2.1]heptane; and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3-C_{40})$cycloalkylene are 1,3-cyclobutylene, 1,3-cyclopentylene, and 1,4-cyclohexylene. Examples of substituted $(C_3-C_{40})$cycloalkylene are 2-trimethylsilyl-1,4-cyclohexylene and 1,2-dimethyl-1,3-cyclohexylene.

The terms "$(C_1-C_{40})$heterohydrocarbyl" and "$(C_1-C_{40})$heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); $S(O)_2$; $S(O)_2N$; $Si(R^C)_2$; $Ge(R^C)_2$; $P(R^C)$; $P(O)(R^C)$; and $N(R^C)$, wherein independently each $R^C$ is hydrogen, unsubstituted $(C_1-C_{18})$hydrocarbyl or an unsubstituted $(C_1-C_{18})$heterohydrocarbyl, or absent (e.g., absent when N comprises —N═). Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The $(C_1-C_{40})$heterohydrocarbyl independently may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-$S(O)_2$—, $(C_1-C_{40})$hydrocarbyl-$Si(R^C)_2$—, $(C_1-C_{40})$hydrocarbyl-$Ge(R^C)_2$—, $(C_1-C_{40})$hydrocarbyl-$N(R^C)$—, $(C_1-C_{40})$hydrocarbyl-$P(R^C)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_1-C_{40})$heteroaryl" means an unsubstituted or substituted (by one or more $R^S$) monocyclic, bicyclic or tricyclic heteroaromatic hydrocarbon radical of from 1 to 40 total carbon atoms and from 1 to 6 heteroatoms, and the monocyclic, bicyclic or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., $(C_1-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The $(C_2-C_{40})$heteroaryl may include 2,7-disubstituted carbazolyl or 3,6-disubstituted carbazolyl, wherein each $R^S$ independently is phenyl, methyl, ethyl, isopropyl, or tertiary-butyl, 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" means fluorine atom (F), chlorine atom (Cl), bromine atom (Br), or iodine atom (I) radical. The term "halide" means fluoride ($F^-$), chloride ($Cl^-$), bromide ($Br^-$), or iodide ($I^-$) anion.

The term "saturated" means lacking carbon-carbon double bonds, carbon-carbon triple bonds, and (in heteroatom-containing groups) carbon-nitrogen, carbon-phosphorous, and carbon-silicon double bonds. When a saturated chemical group is substituted by one or more substituents $R^S$, one or more double and/or triple bonds optionally may or may not be present in substituents $R^S$.

The term "unsaturated" means containing one or more carbon-carbon double bonds, carbon-carbon triple bonds, and (in heteroatom-containing groups) carbon-nitrogen, carbon-phosphorous, carbon-silicon double bonds, or carbon-nitrogen triple bonds, not including any such double bonds that may be present in substituents $R^S$, if any, or in (hetero) aromatic rings, if any.

Compositions, Thiourea Complexes, and Catalyst Systems

In view of the foregoing definitions, specific embodiments of the present application will now be described. It should be understood that the disclosure may be embodied in different forms and should not be construed as limited to any specific embodiment set forth. Rather, the embodiments are provided so that this disclosure will be thorough and complete and will fully convey the scope of the subject matter to those skilled in the art.

Compositions according to embodiments of this disclosure include at least one thiourea complex according to Formula (I):

$$MQ_aX_{4-a} \quad (I)$$

In Formula (I), M is a metal center chosen from Ti, Zr, or Hf. In some embodiments, M is titanium. In other embodiments, M is zirconium. In still other embodiments, M is hafnium. In some embodiments, M is in a formal oxidation state of +2, +3, or +4. In illustrative embodiments, M is in a formal oxidation state of +4.

In Formula (I), a is 1 or 2 and represents a number of groups Q present in the thiourea complex. Thus, the at least one thiourea complex may have either one group Q or two groups Q. When two groups Q are present (i.e., when a=2), each group Q may be the same or different. Each group Q of the at least one thiourea complex is a bidentate thiourea ligand bound to the metal center. The bidentate thiourea ligand may have Formula (Ia), Formula (Ib), or Formula (Ic), in which wavy bonds denote a coordination of an atom to the metal center M and dotted lines denote delocalization of electrons across multiple bonds:

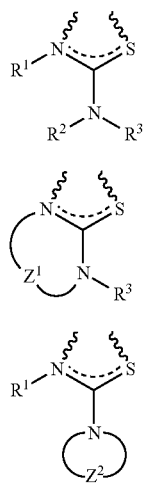

In embodiments for which a=1, the group Q may have any one of Formula (Ia), Formula (Ib), or Formula (Ic). In embodiments for which a=2, both groups Q may have Formula (Ia), both groups Q may have Formula (Ib), both groups may have Formula (Ic), one group Q may have Formula (Ia) while the other group Q has Formula (Ib) or Formula (Ic), or one group Q may have Formula (Ib) while the other group Q has Formula (Ic).

In the at least one thiourea complex, each group $R^1$, $R^2$, and $R^3$ is independently chosen from alkyl groups or aryl groups. Thus, if a=2 and two groups Q are present, each group $R^1$, $R^2$, and $R^3$ in the at least one thiourea complex may be the same or different from other groups $R^1$, $R^2$, and $R^3$ in the at least one thiourea complex. Each group $Z^1$ in the at least one thiourea complex is independently chosen from alkylene groups. Likewise, if a=2 and two groups Q are present, both having Formula (Ib), for example, each group $Z^1$, in the at least one thiourea complex may be the same or different from other groups $Z^1$ in the at least one thiourea complex. Each group $Z^2$ in the at least one thiourea complex is independently chosen from alkylene groups. Likewise, if a=2 and two groups Q are present, both having Formula (Ic), for example, each group $Z^2$, in the at least one thiourea complex may be the same or different from other groups $Z^2$ in the at least one thiourea complex.

In Formula (I), if a=2, groups $R^1$ of the two groups Q, when two groups $R^1$ are present, are optionally linked to each other through at least one covalent bond. In embodiments for which the at least one thiourea complex according to Formula (I) has a=2 and for which the groups $R^1$ of the two groups Q are linked to each other through at least one covalent bond, the two groups Q of the complex form a single tetradentate ligand bound to the metal center M.

In Formula (I), if a=2, groups $R^3$ of the two groups Q, when two groups $R^3$ are present, are optionally linked to each other through at least one covalent bond. In embodiments for which the at least one thiourea complex according to Formula (I) has a=2 and for which the groups $R^3$ of the two groups Q are linked to each other through at least one covalent bond, the two groups Q of the complex form a single tetradentate ligand bound to the metal center M.

In Formula (I), each X is covalently bonded or coordinated to the metal center and is independently chosen from alkyl groups or halides. According to embodiments, each X of the at least one thiourea complex according to Formula (I) independently is a monodentate or polydentate ligand that is neutral, monoanionic, or dianionic. Generally, X and a of the at least one thiourea complex of Formula (I) are chosen in such a way that the thiourea complexes according to Formula (I) are overall neutral. In some embodiments, each X independently is a monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, HC(O)O—, alkoxide or aryloxide (RO—), $(C_1-C_{40})$hydrocarbylC(O)O—, HC(O)N(H)—, $(C_1-C_{40})$hydrocarbyl-C(O)N($(C_1-C_{20})$hydrocarbyl)-, $(C_1-C_{40})$hydrocarbyl-C(O)N(H)—, $R^KR^LB$—, $R^KR^LN$—, $R^KO$—, $R^KS$—, $R^KR^LP$—, or $R^MR^KR^LSi$—, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ as defined previously.

In some embodiments at least one monodentate ligand of X independently is the neutral ligand. In one embodiment, the neutral ligand is a neutral Lewis base group that is $R^XNR^KR^L$, $R^KOR^L$, $R^KSR^L$, or $R^XPR^KR^L$, wherein each $R^X$ independently is hydrogen, $(C_1-C_{40})$hydrocarbyl, $[(C_1-C_{10})$hydrocarbyl$]_3$Si, $[(C_1-C_{10})$hydrocarbyl$]_3$Si($C_1-C_{10}$)hydrocarbyl, or $(C_1-C_{40})$heterohydrocarbyl and each $R^K$ and $R^L$ independently is as defined previously.

In some embodiments, each X is a monodentate ligand that independently is a halogen atom, unsubstituted $(C_1-C_{20})$ hydrocarbyl, unsubstituted $(C_1-C_{20})$hydrocarbylC(O)O—, or an amide such as $R^K R^L N$— wherein each of $R^K$ and $R^L$ independently is an unsubstituted $(C_1-C_{20})$hydrocarbyl. In some embodiments each monodentate ligand X is a chlorine atom, $(C_1-C_{10})$ hydrocarbyl (e.g., $(C_1-C_6)$alkyl or benzyl), unsubstituted $(C_1-C_{10})$hydrocarbylC(O)O—, or $R^K R^L N$— wherein each of $R^K$ and $R^L$ independently is an unsubstituted $(C_1-C_{10})$hydrocarbyl.

In some embodiments there are at least two Xs and the two Xs are taken together to form a bidentate ligand. In some embodiments the bidentate ligand is a neutral bidentate ligand. In one embodiment, the neutral bidentate ligand is a diene of formula $(R^D)_2C=C(R^D)-C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E-C(O-)=CH-C(=O)-R^E$ (D), wherein each $R^D$ independently is H, unsubstituted $(C_1-C_6)$ alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., —$O_2CC(O)O$—), $(C_2-C_{40})$hydrocarbylene dicarbanion, $(C_1-C_{40})$ heterohydrocarbylene dicarbanion, phosphate, or sulfate.

As previously mentioned, the number and charge (neutral, monoanionic, dianionic) of X are selected depending on the formal oxidation state of M such that the polymerization catalysts of Formula (I) and overall neutral.

In some embodiments each X is the same, wherein each X is methyl; isobutyl; neopentyl; neophyl; trimethylsilylmethyl; phenyl; benzyl; or chloro. In some embodiments, a is 1 and all groups X are identical. In some embodiments, a is 2 and all groups X are identical. In some embodiments, all groups X are benzyl. In some embodiments, all groups X are chloro.

In some embodiments at least two X are different. In some embodiments, each X is a different one of methyl; isobutyl; neopentyl; neophyl; trimethylsilylmethyl; phenyl; benzyl; and chloro.

Further non-limiting embodiments of the at least one thiourea complex having Formula (I) will now be described.

Each group $R^1$ of the at least one thiourea complex according to Formula (I) and having one or two groups Q according to Formula (Ia) or (Ic) is bound to a metal-bound nitrogen atom of the thiourea ligand and is independently chosen from alkyl groups or aryl groups. Thus, if multiple groups $R^1$ are present in one thiourea complex, each individual group $R^1$ may be an alkyl group, each individual group $R^1$ may be an aryl group, or one or more individual group $R^1$ may be an alkyl group while one or more other individual groups $R^1$ may be an aryl group. In some embodiments, one or more individual groups $R^1$ may be an alkyl group chosen from $(C_1-C_{40})$hydrocarbyls; substituted $(C_1-C_{40})$hydrocarbyls; $(C_1-C_{40})$heterohydrocarbyls; substituted $(C_1-C_{40})$heterohydrocarbyls; $(C_1-C_{10})$hydrocarbyls; substituted $(C_1-C_{10})$hydrocarbyls; $(C_1-C_{10})$heterohydrocarbyls; or substituted $(C_1-C_{10})$heterohydrocarbyls, for example. In some embodiments, one or more individual groups $R^1$ may be an aryl group chosen from $(C_6-C_{40})$aryl groups, substituted $(C_6-C_{40})$ aryl groups; $(C_6-C_{10})$aryl groups, substituted $(C_6-C_{10})$ aryl groups, for example.

In illustrative embodiments, each group $R^1$ may be independently chosen from phenyl, substituted phenyl, a $(C_3-C_{10})$cycloalkyl group, or a $(C_1-C_{10})$alkyl group. In further illustrative embodiments, each group $R^1$ may be independently chosen from phenyl, substituted phenyl, or a $(C_3-C_{10})$cycloalkyl group such as cyclohexyl, for example. In further illustrative embodiments, each group $R^1$ may be substituted phenyl. In further illustrative embodiments, each group $R^1$ may be cyclohexyl.

In further illustrative embodiments, one or more group $R^1$ may be independently chosen from a $(C_3-C_{10})$cycloalkyl group or substituted phenyl groups according to the following formula:

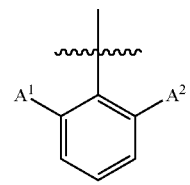

in which $A^1$ and $A^2$ are independently hydrogen or a $(C_1-C_{10})$ alkyl group. In some embodiments, groups $A^1$ and $A^2$ may be independently hydrogen; methyl; ethyl; propyl; 1-methylethyl; 1,1-dimethylethyl; or butyl. In other embodiments, groups $A^1$ and $A^2$ may both be hydrogen, whereby group $R^1$ would be phenyl. In other embodiments, groups $A^1$ and $A^2$ may both be methyl. In other embodiments, groups $A^1$ and $A^2$ may both be 1-methylethyl.

Each group $R^2$ of the at least one thiourea complex according to Formula (I) and having one or two groups Q according to Formula (Ia) is bound to a secondary nitrogen atom of the thiourea ligand and is independently chosen from alkyl groups or aryl groups. Thus, if multiple groups $R^2$ are present in one thiourea complex, each individual group $R^2$ may be an alkyl group, each individual group $R^2$ may be an aryl group, or one or more individual group $R^2$ may be an alkyl group while one or more other individual groups $R^2$ may be an aryl group. In some embodiments, one or more individual groups $R^2$ may be an alkyl group chosen from $(C_1-C_{40})$hydrocarbyls; substituted $(C_1-C_{40})$hydrocarbyls; $(C_1-C_{40})$heterohydrocarbyls; substituted $(C_1-C_{40})$heterohydrocarbyls; $(C_1-C_{10})$hydrocarbyls; substituted $(C_1-C_{10})$hydrocarbyls; $(C_1-C_{10})$heterohydrocarbyls; or substituted $(C_1-C_{10})$heterohydrocarbyls, for example. In some embodiments, one or more individual groups $R^2$ may be an aryl group chosen from $(C_6-C_{40})$aryl groups, substituted $(C_6-C_{40})$aryl groups; $(C_6-C_{10})$aryl groups, or substituted $(C_6-C_{10})$ aryl groups, for example.

In illustrative embodiments, each group $R^2$ may be independently chosen from $(C_1-C_{40})$alkyl groups, $(C_1-C_{20})$alkyl groups, $(C_1-C_{10})$alkyl groups, or phenyl-terminated $(C_1-C_5)$ hydrocarbyl groups. In further illustrative embodiments, each group $R^2$ may be independently chosen from —$(CH_2)_n$Ph groups, where n is from 0 to 5, from 1 to 5, or from 4 to 5, for example. In further illustrative embodiments, group $R^2$ may be a benzyl group (—$CH_2Ph$).

Each group $R^3$ of the at least one thiourea complex according to Formula (I) and having one or two groups Q according to Formula (Ia) or (Ib) is bound to a secondary nitrogen atom of the thiourea ligand and is independently chosen from alkyl groups or aryl groups. Thus, if multiple groups $R^3$ are present in one thiourea complex, each individual group $R^3$ may be an alkyl group, each individual group $R^3$ may be an aryl group, or one or more individual group $R^3$ may be an alkyl group while one or more other individual groups $R^3$ may be an aryl group. In some embodiments, one or more individual groups $R^3$ may be an alkyl group chosen from $(C_1-C_{40})$hydrocarbyls; substituted $(C_1-C_{40})$hydrocarbyls; $(C_1-C_{40})$heterohydrocarbyls; substituted $(C_1-C_{40})$heterohydrocarbyls; $(C_1-C_{10})$hydrocarbyls; substituted $(C_1-C_{10})$hydrocarbyls; $(C_1-C_{10})$heterohydrocarbyls; or substituted $(C_1-C_{10})$heterohydrocarbyls, for example. In some embodiments, one or more individual groups $R^3$ may be an aryl group chosen from $(C_6-C_{40})$aryl groups, substituted $(C_6-C_{40})$ aryl groups; $(C_6-C_{10})$aryl groups, substituted $(C_6-C_{10})$ aryl groups, for example.

In illustrative embodiments, each group $R^3$ may be independently chosen from $(C_1-C_{40})$alkyl groups, $(C_1-C_{20})$alkyl groups, $(C_1-C_{10})$alkyl groups, or phenyl-terminated $(C_1-C_5)$ hydrocarbyl groups. In further illustrative embodiments, each group $R^3$ may be independently chosen from $—(CH_2)_n Ph$ groups, where n is from 0 to 5, from 1 to 5, or from 4 to 5, for example. In further illustrative embodiments, group $R^3$ may be a benzyl group ($—CH_2Ph$). In further illustrative embodiments, when both $R^2$ and $R^3$ are present in the at least one thiourea complex and not joined to form a group $Z^2$, $R^3$ may be identical to $R^2$.

Each group $Z^1$ of the at least one thiourea complex according to Formula (I) and having one or two groups Q according to Formula (Ia) is independently chosen from alkylene groups such as, for example, $(C_3-C_{40})$hydrocarbylene, substituted $(C_3-C_{40})$hydrocarbylene, $(C_3-C_{10})$hydrocarbylene, substituted $(C_3-C_{10})$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. In illustrative embodiments, each group $Z^1$ may be a $C_4$ hydrocarbylene such as $—(CH_2)_4—$ or a $C_5$ hydrocarbylene such as $—(CH_2)_5—$.

Each group $Z^2$ of the at least one thiourea complex according to Formula (I) and having one or two groups Q according to Formula (Ic) is independently chosen from alkylene groups such as, for example, $(C_3-C_{40})$hydrocarbylene, substituted $(C_3-C_{40})$hydrocarbylene, $(C_3-C_{10})$hydrocarbylene, substituted $(C_3-C_{10})$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. In illustrative embodiments, each group $Z^2$ may be a $C_4$ hydrocarbylene such as $—(CH_2)_4—$ or a $C_5$ hydrocarbylene such as $—(CH_2)_5—$.

As previously described, in the at least one thiourea complex according to Formula (I), if a=2, groups $R^1$ of the two groups Q are optionally linked to each other through at least one covalent bond. In embodiments for which the at least one thiourea complex according to Formula (I) has a=2 and for which the groups $R^1$ of the two groups Q are linked to each other through at least one covalent bond, the groups $R^1$ may form a bridging group $Z^3$. When present, bridging groups $Z^3$ of the at least one thiourea complex according to Formula (I) may be independently chosen from alkylene groups such as, for example, $(C_3-C_{40})$hydrocarbylene, substituted $(C_3-C_{40})$hydrocarbylene, $(C_3-C_{10})$hydrocarbylene, substituted $(C_3-C_{10})$hydrocarbylene, $(C_4-C_5)$hydrocarbylene, substituted $(C_4-C_5)$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. Bridging groups $Z^3$ will be described subsequently in greater detail, with reference to thiourea complexes of Formulas (IVa), (IVb), and (IVc).

As previously described, in the at least one thiourea complex according to Formula (I), if a=2, groups $R^3$ of the two groups Q are optionally linked to each other through at least one covalent bond. In embodiments for which the at least one thiourea complex according to Formula (I) has a=2 and for which the groups $R^3$ of the two groups Q are linked to each other through at least one covalent bond, the groups $R^3$ may form a bridging group $Z^4$. When present, bridging groups $Z^4$ of the at least one thiourea complex according to Formula (I) may be independently chosen from alkylene groups such as, for example, $(C_3-C_{40})$hydrocarbylene, substituted $(C_3-C_{40})$hydrocarbylene, $(C_3-C_{10})$hydrocarbylene, substituted $(C_3-C_{10})$hydrocarbylene, $(C_4-C_5)$hydrocarbylene, substituted $(C_4-C_5)$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. Bridging groups $Z^4$ will be described subsequently in greater detail, with reference to thiourea complexes of Formulas (Va), (Vb), and (Vc).

Illustrative embodiments of the at least one thiourea complex having Formula (I) will now be described.

According to some embodiments, the at least one thiourea complex may have Formula (I), in which a is 1, such that the at least one thiourea complex has Formula (IIa), Formula (IIb), or Formula (IIc):

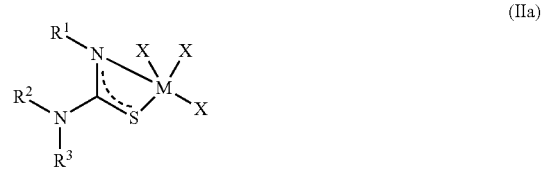

(IIa)

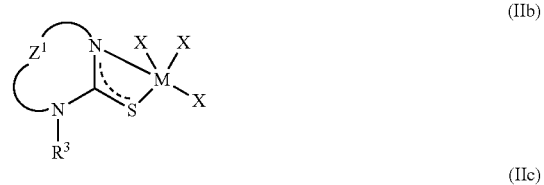

(IIb)

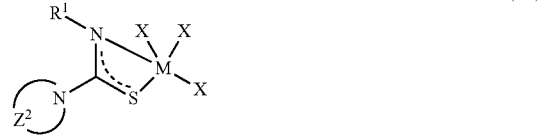

(IIc)

where M, $R^1$, $R^2$, $R^3$, $Z^1$, $Z^2$, and X are as defined in Formula (I) and previously described.

In illustrative embodiments, the at least one thiourea complex has Formula (IIa) or Formula (IIc), and group $R^1$ is a substituted phenyl group or a $(C_1-C_{10})$cycloalkyl group. Examples of $R^1$ as substituted phenyl group include groups according to the following formula:

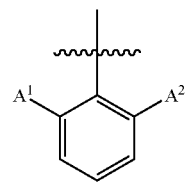

in which $A^1$ and $A^2$ are independently hydrogen or a $(C_1$-$C_{10})$ alkyl group. In some such embodiments, groups $A^1$ and $A^2$ may be independently chosen from hydrogen; methyl; ethyl; propyl; 1-methylethyl (isopropyl); 1,1-dimethylethyl (tert-butyl); or n-butyl. In other such embodiments, groups $A^1$ and $A^2$ may both be hydrogen, whereby group $R^1$ is phenyl. In some embodiments, groups $A^1$ and $A^2$ may be identical. For example, both groups $A^1$ and $A^2$ may be methyl; both groups $A^1$ and $A^2$ may be ethyl; both groups $A^1$ and $A^2$ may be propyl; both 1-methylethyl; both groups $A^1$ and $A^2$ may be 1,1-dimethylethyl; or both groups $A^1$ and $A^2$ may be butyl. In other such embodiments, both groups $A^1$ and $A^2$ may be methyl or both groups $A^1$ and $A^2$ may be 1-methylethyl.

In illustrative embodiments, the at least one thiourea complex has Formula (IIa), where $R^2$ and $R^3$ are independently —$(CH_2)_n$Ph groups, where n is from 0 to 5, from 1 to 5, or from 4 to 5. In some embodiments, the at least one thiourea complex may have Formula (IIa), where $R^2$ and $R^3$ are both —$CH_2$Ph.

In illustrative embodiments, the at least one thiourea complex has Formula (IIc), where $Z^2$ is a $(C_4$-$C_{11})$alkylene group or a $(C_4$-$C_5)$alkylene group. In such embodiments, $Z^2$ may be a hydrocarbyl group —$(CH_2)_n$—, where n is from 4 to 10 or from 4 to 5. When group $Z^2$ is —$(CH_2)_4$—, the combination of group $Z^2$ and the nitrogen atom to which $Z^2$ is bound form a five-membered pyrrolidinyl group. When group $Z^2$ is —$(CH_2)_5$—, the combination of group $Z^2$ and the nitrogen atom to which $Z^2$ is bound form a six-membered piperidinyl group.

In illustrative embodiments, the at least one thiourea complex has Formula (IIc), where $Z^2$ is —$(CH_2)_4$— or —$(CH_2)_5$—; and each $R^1$ is a disubstituted phenyl group or a $(C_1$-$C_{10})$cycloalkyl group such as cyclohexyl, for example. Examples of disubstituted phenyl groups include 2,5-dimethylphenyl and 2,5-di(1-methylethyl)phenyl.

In illustrative embodiments, the at least one thiourea complex has Formula (IIa), Formula (IIb), or Formula (IIc) and all groups X are identical. For example, each group X may be benzyl or each group X may be chloride.

Specific illustrative and non-limiting embodiments of thiourea complexes having Formula (IIa) include compounds C8 and C12:

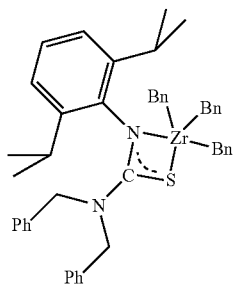
(C8)

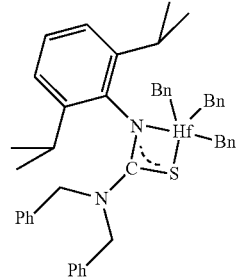
(C12)

Specific illustrative and non-limiting embodiments of thiourea complexes having Formula (IIc) include compounds C5, C6, C7, C9, C10, and C11:

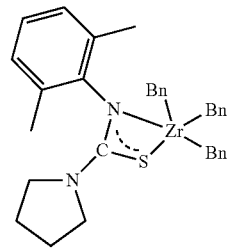
(C5)

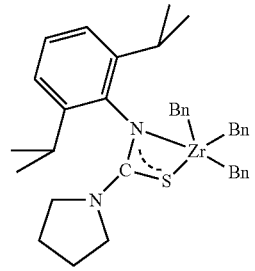
(C6)

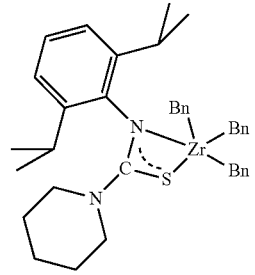
(C7)

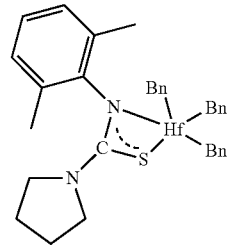
(C9)

(C10)

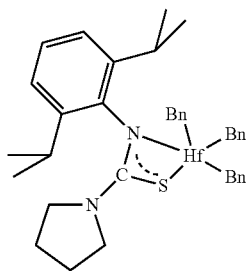

(C11)

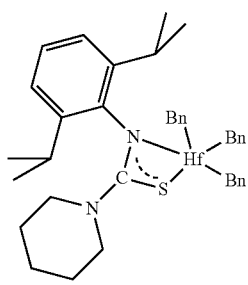

According to some embodiments, the at least one thiourea complex may have Formula (I), in which a is 2, and the at least one thiourea complex may have Formula (IIIa), Formula (IIIb), Formula (IIIc), Formula (IIId), Formula (IIIe), or Formula (IIIf):

(IIIa)
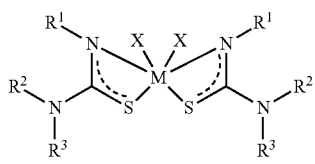

(IIIb)
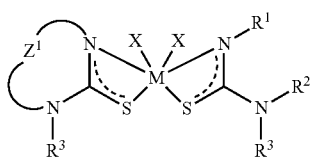

(IIIc)
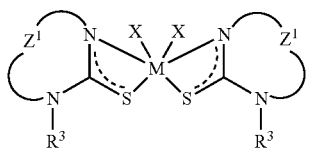

(IIId)
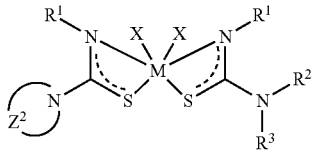

(IIIe)
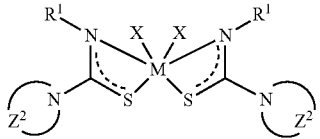

(IIIf)
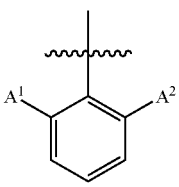

where M, $R^1$, $R^2$, $R^3$, $Z^1$, $Z^2$, and X are as defined in Formula (I) and previously described.

In illustrative embodiments, the at least one thiourea complex has Formula (IIId), Formula (IIIe), or Formula (IIIf), where $Z^2$ is a ($C_4$-$C_{10}$)alkylene group and groups M, $R^1$, $R^2$, $R^3$, $Z^1$, and X are as defined in Formula (I). Examples of such embodiments include those in which $Z^2$ is a ($C_4$-$C_{10}$)hydrocarbyl group, a ($C_4$-$C_5$)alkylene group, or a ($C_4$-$C_5$)hydrocarbyl group. Further examples of such embodiments include those in which $Z^2$ is —$(CH_2)_n$—, where n is from 4 to 10 or from 4 to 5. In particular examples, $Z^2$ may be —$(CH_2)_4$— or —$(CH_2)_5$—.

In further illustrative embodiments, the at least one thiourea complex has Formula (IIId), Formula (IIIe), or Formula (IIIf); group $Z^2$ may be a ($C_4$-$C_{10}$)alkylene group, a ($C_4$-$C_{10}$)hydrocarbyl group, a ($C_4$-$C_5$)alkylene group, or a ($C_4$-$C_5$)hydrocarbyl group; one or both groups $R^1$ may be independently chosen from cyclohexyl and disubstituted phenyl; and groups M, $R^2$, $R^3$, $Z^1$, and X are as defined in Formula (I). Examples of disubstituted phenyl groups $R^1$ include those according to the following formula:

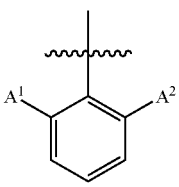

in which $A^1$ and $A^2$ are independently hydrogen or a ($C_1$-$C_{10}$) alkyl group. In some such embodiments, groups $A^1$ and $A^2$ may be independently chosen from hydrogen; methyl; ethyl; propyl; 1-methylethyl (isopropyl); 1,1-dimethylethyl (tert-butyl); or n-butyl. In other such embodiments, groups $A^1$ and $A^2$ may both be hydrogen, whereby group $R^1$ is phenyl. In some embodiments, groups $A^1$ and $A^2$ may be identical. For example, groups $A^1$ and $A^2$ may be both methyl; both ethyl; both propyl; both 1-methylethyl; both 1,1-dimethylethyl; or both butyl. In other such embodiments, both groups $A^1$ and $A^2$ may be methyl or both groups $A^1$ and $A^2$ may be 1-methylethyl.

In illustrative embodiments, the at least one thiourea composition has Formula (IIIa), Formula (IIIb), Formula (IIIc), Formula (IIId), Formula (IIIe), or Formula (IIIf), in which each X is independently a benzyl group or a chloride coordinated to the metal center and groups M, $R^1$, $R^2$, $R^3$, $Z^1$, and $Z^2$ are as defined in Formula (I). In illustrative embodiments, the at least one thiourea composition has Formula (IIIa), Formula (IIIb), Formula (IIIc), Formula (IIId), Formula (IIIe), or Formula (IIIf), in which each X is a benzyl group coordinated to the metal center. In illustrative embodiments, the at least one thiourea composition has Formula (IIIa), Formula (IIIb), Formula (IIIc), Formula (IIId), Formula (IIIe), or Formula (IIIf), in which each X is a chloride coordinated to the metal center.

In illustrative embodiments, the at least one thiourea composition has Formula (IIIa) in which both groups $R^1$ are identical, both groups $R^2$ are identical, both groups $R^3$ are identical, and both groups X are identical. Such embodiments represent examples of thiourea complexes of Formula (I), in which both groups Q are identical. In further illustrative embodiments, the at least one thiourea composition has Formula (IIIc) in which both groups $Z^1$ are identical, both groups $R^3$ are identical, and both groups X are identical. Such embodiments also represent additional examples of thiourea complexes of Formula (I), in which both groups Q are identical. In further illustrative embodiments, the at least one thiourea composition has Formula (IIIe) in which both groups $R^1$ are identical, both groups $Z^2$ are identical, and both groups X are identical. Such embodiments also represent additional examples of thiourea complexes of Formula (I), in which both groups Q are identical. When both groups Q of thiourea complexes of Formula (I) are identical, the thiourea complex typically has at least one plane of symmetry.

Specific illustrative and non-limiting embodiments of thiourea complexes having Formula (IIIe) include compounds C1, C2, C3, and C4:

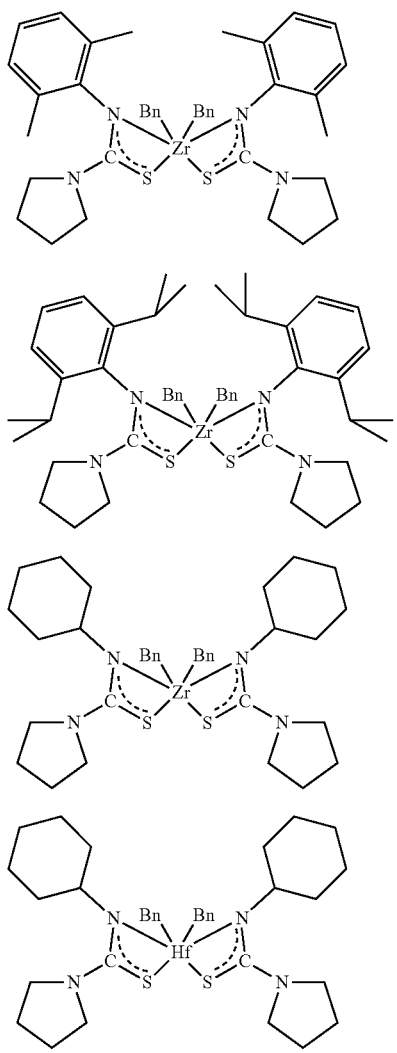

According to some embodiments, the at least one thiourea complex may have Formula (I), in which a is 2; groups $R^1$ of the two groups Q are linked to each other as a bridging group $Z^3$; and the at least one thiourea complex has Formula (IVa), Formula (IVb), or Formula (IVc):

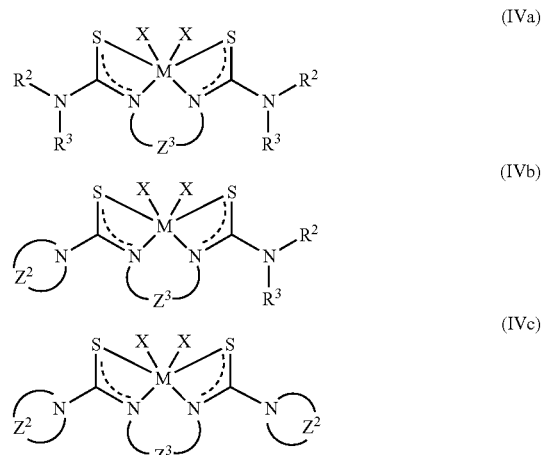

where M, $R^1$, $R^2$, $R^3$, $Z^2$, and X are as defined in Formula (I) and previously described; and $Z^3$ is an alkylene group formed from the joining of two groups $R^1$ as defined in Formula (I) through at least one covalent bond.

In illustrative embodiments, group $Z^3$ of thiourea complexes according to Formula (IVa), Formula (IVb), or Formula (IVc) may be alkylene groups such as, for example, $(C_3-C_{40})$hydrocarbylene, substituted $(C_3-C_{40})$hydrocarbylene, $(C_3-C_{10})$hydrocarbylene, substituted $(C_3-C_{10})$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. In such embodiments, M, $R^2$, $R^3$, $Z^2$, and X, as applicable to the particular formula, are as defined in Formula (I) as previously described. In illustrative embodiments, group $Z^3$ may be a $(C_3-C_{12})$hydrocarbylene, a $(C_3-C_{10})$hydrocarbylene, a $C_4$ hydrocarbylene such as —$(CH_2)_4$—, or a $C_5$ hydrocarbylene such as —$(CH_2)_5$—.

In illustrative embodiments, the at least one thiourea composition has Formula (IVa), Formula (IVb), or Formula (IVc), in which each X is independently a benzyl group or a chloride coordinated to the metal center. In illustrative embodiments, the at least one thiourea composition has Formula (IVa), Formula (IVb), or Formula (IVc), in which each X is a benzyl group coordinated to the metal center. In illustrative embodiments, the at least one thiourea composition has Formula (IVa), Formula (IVb), or Formula (IVc), in which each X is a chloride coordinated to the metal center.

In illustrative embodiments, the at least one thiourea composition has Formula (IVa) in which both groups $R^2$ are identical, both groups $R^3$ are identical, and both groups X are identical. Such embodiments represent examples of thiourea complexes of Formula (I), in which both groups Q are identical. In further illustrative embodiments, the at least one thiourea composition has Formula (IVc) in which both groups $Z^2$ are identical and both groups X are identical. Such embodiments represent additional examples of thiourea complexes of Formula (I), in which both groups Q are identical.

According to some embodiments, the at least one thiourea complex may have Formula (I), in which a is 2; groups $R^3$ of the two groups Q are linked to each other as a bridging group $Z^4$; and the at least one thiourea complex has Formula (Va), Formula (Vb), or Formula (Vc):

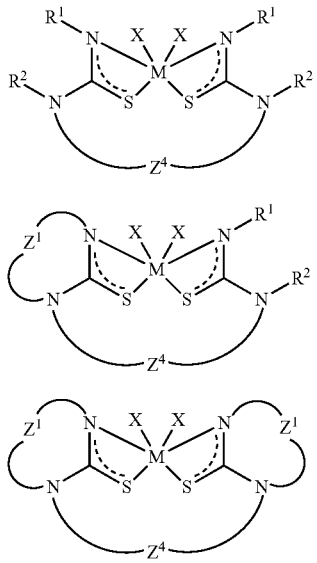

where M, $R^1$, $R^2$, $Z^1$, and X are as defined in Formula (I) and previously described; and $Z^4$ is an alkylene group formed from the joining of two groups $R^3$ as defined in Formula (I) through at least one covalent bond.

In illustrative embodiments, group $Z^4$ of thiourea complexes according to Formula (Va), Formula (Vb), or Formula (Vc) may be alkylene groups such as, for example, $(C_3-C_{40})$ hydrocarbylene, substituted $(C_3-C_{40})$hydrocarbylene, $(C_3-C_{10})$hydrocarbylene, substituted $(C_3-C_{10})$hydrocarbylene, $[(C+Si)_3-(C+Si)_{40}]$organosilylene, substituted $[(C+Si)_3-(C+Si)_{40}]$organosilylene, $[(C+Ge)_3-(C+Ge)_{40}]$organogermylene, or substituted $[(C+Ge)_3-(C+Ge)_{40}]$organogermylene. In such embodiments, M, $R^1$, $R^2$, $Z^1$, and X, as applicable to the particular formula, are as defined in Formula (I) as previously described. In illustrative embodiments, group $Z^4$ may be a $(C_3-C_{12})$hydrocarbylene, a $(C_3-C_{10})$hydrocarbylene, a $C_4$ hydrocarbylene such as —$(CH_2)_4$—, or a $C_5$ hydrocarbylene such as —$(CH_2)_5$—.

In illustrative embodiments, the at least one thiourea composition has Formula (Va), Formula (Vb), or Formula (Vc), in which each X is independently a benzyl group or a chloride coordinated to the metal center. In illustrative embodiments, the at least one thiourea composition has Formula (Va), Formula (Vb), or Formula (Vc), in which each X is a benzyl group coordinated to the metal center. In illustrative embodiments, the at least one thiourea composition has Formula (Va), Formula (Vb), or Formula (Vc), in which each X is a chloride coordinated to the metal center.

In illustrative embodiments, the at least one thiourea composition has Formula (Va) in which both groups $R^1$ are identical, both groups $R^2$ are identical, and both groups X are identical. Such embodiments represent examples of thiourea complexes of Formula (I), in which both groups Q are identical. In further illustrative embodiments, the at least one thiourea composition has Formula (Vc) in which both groups $Z^1$ are identical and both groups X are identical. Such embodiments represent additional examples of thiourea complexes of Formula (I), in which both groups Q are identical.

In further embodiments, the compositions may include combinations or mixtures of a plurality of thiourea complexes according to Formula (I). For example, the compositions may include two, three, four, five, or more than five thiourea complexes according to Formula (I). In illustrative embodiments, the plurality of thiourea complexes according to Formula (I) may include any of the compounds C1, C2, C3, C4, C5, C6, C7, C8, C9, C10, C11, or C12, as previously described, in any combination or proportion.

Polyolefin Compositions

Polyolefin compositions such as ethylene-co-alkylene copolymers according to embodiments of this disclosure include the reaction product of ethylene and one or more olefinic monomers in the presence of a catalytic amount of at least one of the compositions previously described, which include at least one thiourea complex, under polymerization conditions and optionally in the presence of one or more co-catalysts and/or scavengers.

The polyolefin compositions can be, for example, be an ethylene-based polymer, for example homopolymers and/or interpolymers (including copolymers) of ethylene and optionally one or more comonomers such as α-olefins. Such ethylene-based polymers can have a density in the range of 0.860 g/cm$^3$ to 0.973 g/cm$^3$. All individual values and subranges from 0.860 g/cm$^3$ to 0.973 g/cm$^3$ are included herein and disclosed herein; for example, the density can be from a lower limit of 0.860, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

As used herein, the term "ethylene-based polymer" means a polymer having greater than 50 mol. % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$, also known as polydispersity index (PDI)) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In another embodiment, the ethylene-based polymers may have molecular weight distribution, $M_w/M_n$, of less than 2, e.g., when chain transfer agents are used in the polymerization. All individual values and subranges less than 2 are included and disclosed herein. For example, the $M_w/M_n$ of the ethylene-based polymers may be less than 2, or in the alternative, less than 1.9, or in the alternative, less than 1.8, or in the alternative, less than 1.5. In a particular embodiment, the ethylene-based polymer has a molecular weight distribution from 0.5 to 2.

In one embodiment, the ethylene-based polymers can have a molecular weight ($M_w$) in the range of from equal to or greater than 20,000 g/mole, for example, in the range of from 20,000 to 1,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein;

for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In one embodiment, the ethylene-based polymer comprises an olefin block copolymer prepared according to an aforementioned chain-shuttling polymerization process. The olefin block copolymer or poly(ethylene alpha-olefin) block copolymer comprises an ethylene-derived hard segment (i.e., polyethylene hard segment) and a soft segment comprising residuals from the alpha-olefin and ethylene. The residuals of the alpha-olefin and ethylene typically are approximately randomly distributed in the soft segment. Preferably, the polyethylene hard segment is characterizable as having less than 5 mole percent (mol %) of a residual of the alpha-olefin covalently incorporated therein. Preferably, the poly(ethylene alpha-olefin) block copolymer is characterizable as having a melting temperature of greater than 100° C., and more preferably greater than 120° C., as determined by Differential Scanning Calorimetry using the procedure described later. The poly(ethylene alpha-olefin) block copolymers comprise ethylene residuals and one or more copolymerizable α-olefin comonomer residuals (i.e., ethylene and one or more copolymerizable α-olefin comonomers in polymerized form). The poly(ethylene alpha-olefin) block copolymers are characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula: $(AB)_n$, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" segments refer to blocks of polymerized units in which ethylene residuals are present in an amount greater than 95 weight percent, and preferably greater than 98 weight percent in the poly(ethylene alpha-olefin) block copolymers. In other words, the comonomer (i.e., alpha-olefin) residuals content in the hard segments is less than 5 weight percent, and preferably less than 2 weight percent. In some embodiments, the hard segments comprise all or substantially all ethylene residuals. The phrases "polyethylene hard segment" and "ethylene-derived hard segment" are synonymous and mean the hard segment portion of a poly(ethylene alpha-olefin) block copolymer.

"Soft" segments refer to blocks of polymerized units in which the comonomer (i.e., alpha-olefin) residuals content is greater than 5 weight percent, preferably greater than 8 weight percent, greater than 10 weight percent, or greater than 15 weight percent in the poly(ethylene alpha-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

Polymerization Process

Any conventional polymerization processes may be employed to produce the polyolefin composition according to the present invention. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition may be produced, for example, via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120° C. to 300° C.; for example, from 160° C. to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In this fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosure of which are incorporated herein to the extent permitted.

In one embodiment, the catalyst composition containing at least one thiourea complex according to Formula (I) or of any embodiment of this disclosure may be combined with one or more additional catalysts in a polymerization process. Suitable catalysts for use include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based oil metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, may be present in levels from about 0 to about 20 percent, based on the weight of the inventive ethylene-based polymers and the one or more additives and/or fillers. The ethylene-based polymers may further be blended with one or more polymers to form a blend.

EXAMPLES

The following examples illustrate various catalyst compositions according to embodiments previously described but are not intended to limit the scope of the present disclosure in any manner.

All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Solvents used for experiments performed in a nitrogen-filled glovebox were further dried by storage over activated 4-Å molecular sieves. Glassware for moisture-sensitive reactions was dried in an oven overnight prior to use.

NMR spectra were recorded on Varian 400-MR and VNMRS-500 spectrometers. $^1H$ NMR (proton NMR) data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from internal tetramethylsilane (TMS, δ scale) using residual protons in the deuterated solvent as references. $^{13}C$ NMR (carbon NMR) data were determined with $^1H$ decoupling, and the chemical shifts are reported in ppm versus tetramethylsilane.

Catalyst efficiency is calculated by dividing the number of grams of the polyolefin copolymer prepared by the total number of grams of metal M in the catalyst used (that is, grams of metal M of the at least one metal-ligand complex of Formula (I)). Thus, catalyst efficiency may be expressed as grams polyolefin copolymer prepared divided by grams metal M of metal-ligand complex(es) of Formula (I) used in the polymerization reaction.

Molecular weight data are determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 ppm of butylated hydroxyl toluene (BHT). Each sample was then diluted to 1 mg/mL immediately before the injection of a 250-μL aliquot of the sample. The GPC was equipped with two Polymer Labs PLgel 10-μm MIXED-B columns (300× 10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

Melt temperature ($T_m$), glass transition temperature ($T_g$), crystallization temperature ($T_c$), and Heat of Melt are measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per minute. Traces are analyzed individually using TA Universal Analysis software or TA Instruments TRIOS software.

Example 1

| General Ligand Synthesis | | | |
|---|---|---|---|
| Isothiocyanate | Amine | Ligand | |
| $R^1$—N=C=S | + HN(pyrrolidine) → | $R^1$—NH—C(=S)—N(pyrrolidine) | (1a) |
| $R^1$—N=C=S | + HN(piperidine) → | $R^1$—NH—C(=S)—N(piperidine) | (1b) |
| $R^1$—N=C=S | + HN(CH$_2$Ph)$_2$ → | $R^1$—NH—C(=S)—N(CH$_2$Ph)$_2$ | (1b) |

Ligands according to general structures 1a, 1b, or 1c are prepared by adding one molar equivalent of a neat amine dropwise to a solution containing one molar equivalent of isothiocyanate ($R^1$—N=C=S, where $R^1$ is as defined previously in this specification) in diethyl ether (Et$_2$O) at 25° C. A white precipitate forms instantaneously. After stirring the solution for 30 min at 25° C., the precipitate is isolated by filtration, washed with two aliquots of dry Et₂O, and dried under vacuum. Yields of the ligands prepared according to general structures 1a, 1b, or 1c using the foregoing reaction steps are nearly quantitative when R¹ is 2,5-dimethylphenyl; 2,5-di(1-methylethyl)-phenyl, or cyclohexyl. Syntheses and characterization of exemplary ligands L1, L2, L3, L4, and L5, each according to one of the general structures 1a, 1b, or 1c, are described in Examples 2-6.

Example 2

Synthesis of Ligand L1

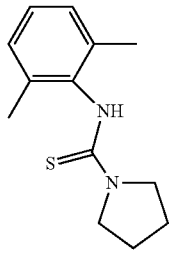

(L1)

Ligand L1 was prepared according to the general method of Example 1, in which the group R¹ was 2,5-dimethylphenyl and the amine was pyrrolidine, in nearly quantitative yield. Ligand L1 was characterized by proton NMR and carbon-13 NMR as follows: ¹H NMR (400 MHz, CDCl₃) δ 7.11 (m, 3H), 6.49 (br s, 1H), 3.69 (br s, 4H), 2.27 (s, 6H), 2.05 (br s, 4H). ¹³C NMR (101 MHz, DMSO-d₆) δ 177.59, 138.21, 136.51, 127.46, 127.46, 126.39, 25.20, 18.19.

Example 3

Synthesis of Ligand L2

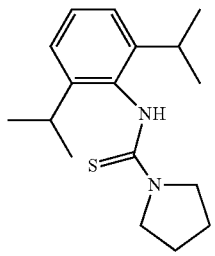

(L2)

Ligand L2 was prepared according to the general method of Example 1, in which the group R¹ was 2,5-di(1-methylethyl)-phenyl and the amine was pyrrolidine, in nearly quantitative yield. Ligand L1 was characterized by proton NMR and carbon-13 NMR as follows: ¹H NMR (400 MHz, CDCl₃) δ 7.33 (t, J=7.7 Hz, 1H), 7.19 (d, J=7.7 Hz, 2H), 6.36 (br s, 1H), 3.76 (br s, 4H), 3.13 (m, 2H), 2.09 (br s, 4H), 1.30 (d, J=6.8 Hz, 6H), 1.16 (d, J=6.9 Hz, 6H). ¹³C NMR (101 MHz, CDCl₃) δ 179.97, 146.97, 134.06, 128.78, 128.63, 125.87, 125.56, 123.67, 77.16, 28.62, 25.88, 24.38, 23.08.

Example 4

Synthesis of Ligand L3

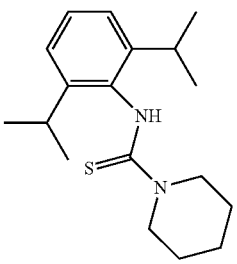

(L3)

Ligand L3 was prepared according to the general method of Example 1, in which the group R¹ was 2,5-di(1-methylethyl)-phenyl and the amine was piperidine, in nearly quantitative yield. Ligand L1 was characterized by proton NMR and carbon-13 NMR as follows: ¹H NMR (400 MHz, C₆D₆) δ 7.24 (m, 1H), 7.15 (m, 2H), 6.26 (br s, 1H), 3.38 (m, 4H), 3.27 (m, 2H), 1.40 (d, J=6.8 Hz, 6H), 1.19 (d, J=6.9 Hz, 6H), 1.15 (m, 6H). ¹³C NMR (101 MHz, CDCl₃) δ 146.36, 134.48, 129.06, 128.32, 124.80, 123.62, 122.54, 50.91, 49.70, 28.58, 25.74, 25.45, 24.35, 24.15, 24.08, 23.30.

Example 5

Synthesis of Ligand L4

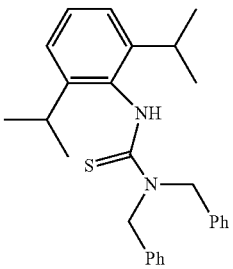

(L4)

Ligand L4 was prepared according to the general method of Example 1, in which the group R¹ was 2,5-di(1-methylethyl)-phenyl and the amine was dibenzylamine (N-benzyl-1-phenylmethanamine), in nearly quantitative yield. Ligand L1 was characterized by proton NMR and carbon-13 NMR as follows: 1H NMR (400 MHz, C₆D₆) δ 7.21 (m, 1H), 7.10 (m, 10H), 7.03 (m, 2H), 6.48 (s, 1H), 4.81 (br s, 4H), 3.09 (m, 2H), 1.45 (d, J=6.9 Hz, 6H), 0.92 (d, J=6.9 Hz, 6H). ¹³C NMR (101 MHz, CDCl₃) δ 184.27, 146.44, 136.22, 134.42, 129.17, 128.40, 128.10, 126.94, 123.52, 54.93, 28.68, 24.20, 23.07.

Example 6

Synthesis of Ligand L5

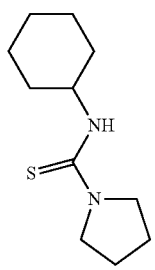

(L5)

Ligand L5 was prepared according to the general method of Example 1, in which the group $R^1$ was cyclohexyl and the amine was pyrrolidine, in nearly quantitative yield. Ligand L1 was characterized by proton NMR and carbon-13 NMR as follows: 1H NMR (400 MHz, $C_6D_6$) δ 4.70 (m, 1H), 4.56 (d, J=6.9 Hz, 1H), 3.09 (br s, 4H), 2.19 (m, 2H), 1.56 (dt, J=13.5, 3.6 Hz, 2H), 1.45 (dt, J=12.8, 3.7 Hz, 1H), 1.28 (m, 2H), 1.18 (m, 4H), 1.01 (m, 3H). $^{13}C$ NMR (101 MHz, DMSO-$d_6$) δ 176.89, 53.61, 49.46, 32.26, 25.28, 25.16, 24.81.

Example 7

Synthesis and Characterization of Catalyst C1

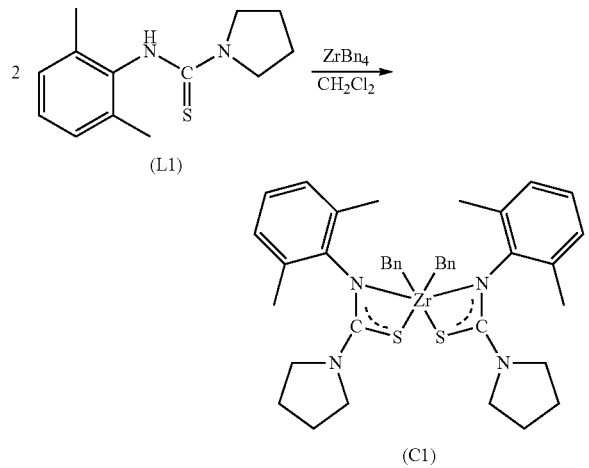

Catalyst C1 was prepared by dissolving in 5 mL of dichloromethane ($CH_2Cl_2$) two molar equivalents of thiourea ligand L1 (0.100 g, 0.43 mmol) prepared according to Example 2 of this specification and then mixing resulting solution with one molar equivalent of tetrabenzylzirconium ($ZrBn_4$) (0.097 g, 0.21 mmol). After 10 min the solvent was removed under vacuum. The solids were further dried under high vacuum overnight to afford the product (catalyst C1) in quantitative yield.

Catalyst C1 was characterized by proton NMR and carbon-13 NMR as follows: $^1H$ NMR (400 MHz, $C_6D_6$) δ 7.39 (dd, J=8.3, 1.1 Hz, 4H), 7.21 (t, J=7.7 Hz, 4H), 6.89 (tt, J=7.2, 1.2 Hz, 2H), 6.78 (s, 6H), 3.42 (br s, 4H), 2.85 (s, 4H), 2.31 (br s, 4H), 2.13 (s, 12H), 0.86 (br s, 8H). $^{13}C$ NMR (101 MHz, $C_6D_6$) δ 174.19, 149.22, 146.77, 133.57, 125.21, 121.47, 80.84, 20.11.

Example 8

Synthesis and Characterization of Catalyst C2

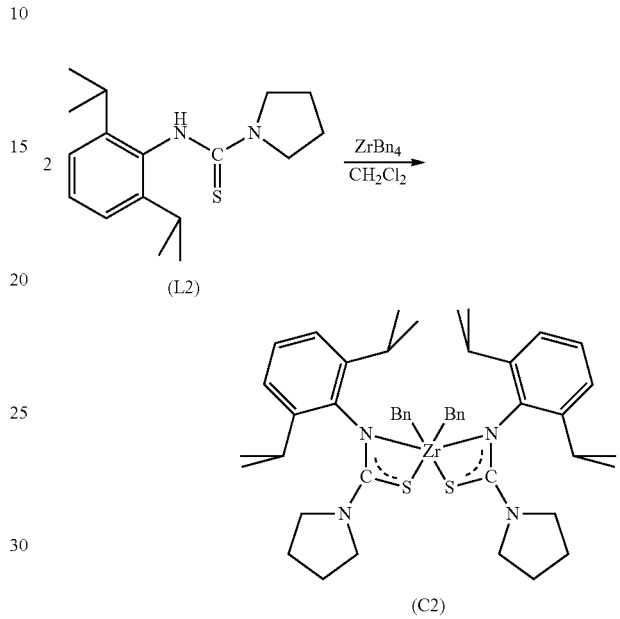

Catalyst C2 was prepared by dissolving in 5 mL of $CH_2Cl_2$ two molar equivalents of thiourea ligand L2 (0.100 g, 0.34 mmol) prepared according to Example 3 of this specification and then mixing the resulting solution with one molar equivalent of $ZrBn_4$ (0.078 g, 0.17 mmol). After 10 min the solvent was removed under vacuum. The solids were further dried under high vacuum overnight to afford the product (catalyst C2) in quantitative yield.

Catalyst C2 was characterized by proton NMR and carbon-13 NMR as follows: $^1H$ NMR (400 MHz, $C_6D_6$) δ 7.36 (d, J=7.1 Hz, 4H), 7.22 (t, J=7.7 Hz, 4H), 7.05 (m, 6H), 6.88 (t, J=7.3 Hz, 2H), 3.50 (dt, J=13.4, 6.7 Hz, 4H), 3.41 (br s, 4H), 2.61 (s, 4H), 2.51 (br s, 4H), 1.34 (d, J=6.8 Hz, 12H), 1.19 (d, J=6.8 Hz, 12H), 0.90 (m, 8H). $^{13}C$ NMR (101 MHz, $C_6D_6$) δ 173.86, 149.34, 144.87, 144.63, 127.99, 126.98, 121.49, 85.58, 29.44, 25.73, 24.63, 21.77.

Example 9

Synthesis and Characterization of Catalyst C3

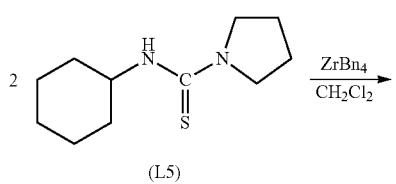

(L5)

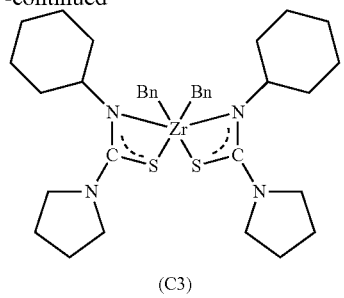

(C3)

Catalyst C3 was prepared by dissolving in 5 mL of CH$_2$Cl$_2$ two molar equivalents of thiourea ligand L5 (0.100 g, 0.47 mmol) prepared according to Example 6 of this specification and then mixing the resulting solution with one molar equivalent of ZrBn$_4$ (0.107 g, 0.24 mmol). After 10 min the solvent was removed under vacuum. The solids were further dried under high vacuum overnight to afford the product (catalyst C$_3$) in quantitative yield.

Catalyst C3 was characterized by proton NMR and carbon-13 NMR as follows: $^1$H NMR (400 MHz, C$_6$D$_6$) δ 7.34 (d, J=7.1 Hz, 4H), 7.14 (m, 4H), 6.83 (t, J=7.3 Hz, 2H), 3.35 (m, 8H), 3.25 (s, 4H), 1.81 (d, J=12.2 Hz, 4H), 1.54 (m, 11H), 1.23 (s, 9H), 1.06 (m, 6H). $^{13}$C NMR (101 MHz, C$_6$D$_6$) δ 177.18, 151.28, 128.27, 127.37, 120.67, 74.64, 58.06, 51.56, 26.46, 26.17, 25.72.

Example 10

Synthesis and Characterization of Catalyst C4

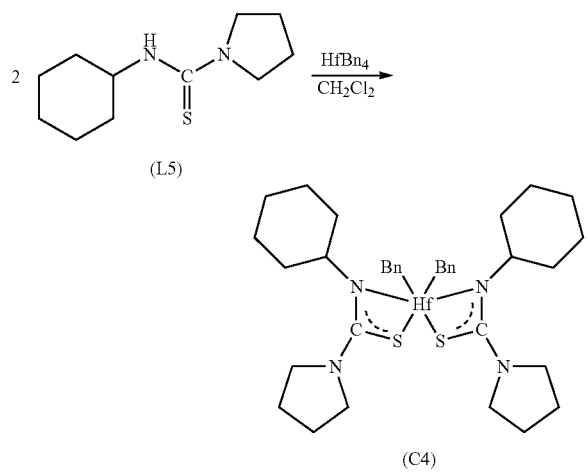

(C4)

Catalyst C4 was prepared by dissolving in 5 mL of CH$_2$Cl$_2$ two molar equivalents of thiourea ligand L5 (0.041 g, 0.19 mmol) prepared according to Example 6 of this specification and the resulting solution was mixed with tetrabenzylhafnium (HfBn$_4$) (0.052 g, 0.10 mmol). After 10 min the solvent was removed under vacuum. The solids were further dried under high vacuum overnight to afford the product (catalyst C4) in quantitative yield.

Catalyst C4 was characterized by proton NMR and carbon-13 NMR as follows: $^1$H NMR (400 MHz, C$_6$D$_6$) δ 7.32 (d, J=7.1 Hz, 4H), 7.18 (m, 4H), 6.79 (t, J=7.3 Hz, 2H), 3.32 (br s, 8H), 2.87 (br s, 2H), 2.78 (br s, 2H), 1.83 (d, J=11.5 Hz, 4H), 1.55 (m, 11H), 1.19 (br s, 9H), 1.06 (br s, 6H). $^{13}$C NMR (101 MHz, C$_6$D$_6$) δ 175.54, 152.01, 129.67, 128.02, 127.50, 126.03, 120.69, 79.45, 57.77, 51.61, 35.29, 34.32, 26.44, 26.19, 25.68.

Example 11

Synthesis and Characterization of Catalyst C5

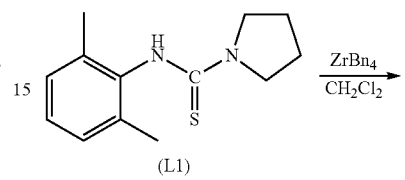

(L1)

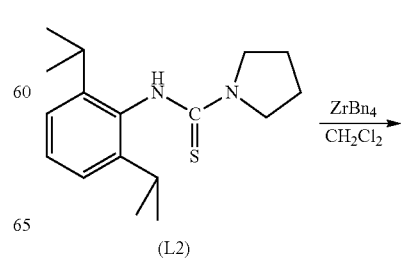

(C5)

Catalyst C5 was prepared by dissolving in 5 mL of CH$_2$Cl$_2$ one molar equivalent of thiourea ligand L1 (0.050 g, 0.21 mmol) prepared according to Example 2 of this specification and mixing the resulting solution with one molar equivalent of ZrBn$_4$ (0.097 g, 0.21 mmol). After 10 min the solvent was removed under vacuum (0.129 g). The product was dissolved in 5 mL of toluene and layered with 10 mL pentane. The vial then was cooled to −30° C. overnight. The resulting cloudy solution was passed through a 0.45-μm syringe filter, and the filtrate was evaporated to dryness under vacuum. The total yield of catalyst C5 was 0.115 g (90%).

Catalyst C5 was characterized by proton NMR and carbon-13 NMR as follows: $^1$H NMR (400 MHz, C$_6$D$_6$) δ 7.15 (m, 6H), 6.96 (t, J=7.4 Hz, 3H), 6.91 (m, 6H), 6.85 (s, 3H), 3.38 (s, 2H), 2.27 (s, 2H), 2.11 (s, 6H), 2.05 (s, 6H), 0.84 (s, 4H). $^{13}$C NMR (101 MHz, C$_6$D$_6$) δ 172.87, 147.46, 142.71, 134.14, 131.30, 130.18, 129.77, 126.12, 123.77, 76.69, 19.56.

Example 12

Synthesis and Characterization of Catalyst C6

(L2)

-continued

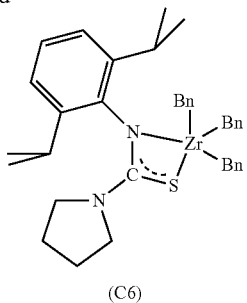

(C6)

Catalyst C6 was prepared by dissolving in 5 mL of CH$_2$Cl$_2$ one molar equivalent of thiourea ligand L2 (0.050 g, 0.17 mmol) prepared according to Example 3 of this specification and mixing the resulting solution with one molar equivalent of ZrBn$_4$ (0.078 g, 0.17 mmol). After 10 min the solvent was removed under vacuum (0.112 g). The product was dissolved in 5 mL of toluene and layered with 10 mL pentane. The vial was cooled to −30° C. overnight. The resulting cloudy solution was passed through a 0.45-μm syringe filter, and the filtrate was evaporated to dryness under vacuum. The total yield of catalyst C6 was 0.110 g (89%).

Catalyst C$_6$ was characterized by proton NMR and carbon-13 NMR as follows: $^1$H NMR (400 MHz, C$_6$D$_6$) δ 7.15 (m, 6H), 7.02 (m, 3H), 6.96 (m, 9H), 3.44 (s, 2H), 3.27 (p, J=6.8 Hz, 2H), 2.50 (s, 2H), 2.18 (s, 6H), 1.24 (d, J=6.8 Hz, 6H), 1.10 (d, J=6.8 Hz, 6H), 0.89 (m, 4H). $^{13}$C NMR (101 MHz, C$_6$D$_6$) δ 173.00, 131.30, 130.04, 130.00, 129.07, 127.22, 124.12, 123.84, 77.24, 29.54, 24.82, 24.20.

Example 13

Synthesis and Characterization of Catalyst C7

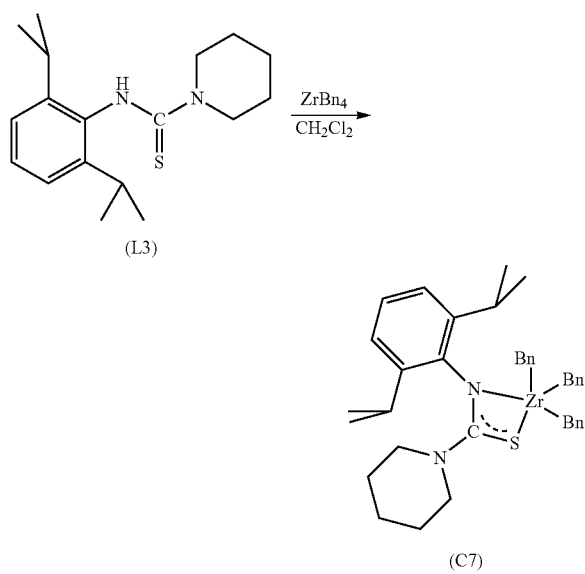

Catalyst C7 was prepared by dissolving in 5 mL of CH$_2$Cl$_2$ one molar equivalent of thiourea ligand L3 (0.050 g, 0.16 mmol) prepared according to Example 4 of this specification and mixing the resulting solution with one molar equivalent of ZrBn$_4$ (0.075 g, 0.16 mmol). After 10 min the solvent was removed under vacuum. The solids were further dried under high vacuum overnight to afford the product (catalyst C7) in quantitative yield.

Catalyst C7 was characterized by proton NMR and carbon-13 NMR as follows: $^1$H NMR (400 MHz, C$_6$D$_6$) δ 7.14 (m, 6H), 7.06 (s, 3H), 6.94 (m, 9H), 3.15 (p, J=6.8 Hz, 2H), 3.01 (br s, 4H), 2.15 (s, 6H), 1.24 (d, J=6.8 Hz, 6H), 1.09 (d, J=6.8 Hz, 6H), 1.02 (m, 4H), 0.96 (m, 2H). $^{13}$C NMR (101 MHz, C$_6$D$_6$) δ 175.65, 145.69, 142.85, 142.58, 130.01, 129.96, 126.92, 124.89, 123.85, 77.40, 49.78, 29.31, 26.64, 24.97, 24.81, 24.36.

Example 14

Synthesis and Characterization of Catalyst C8

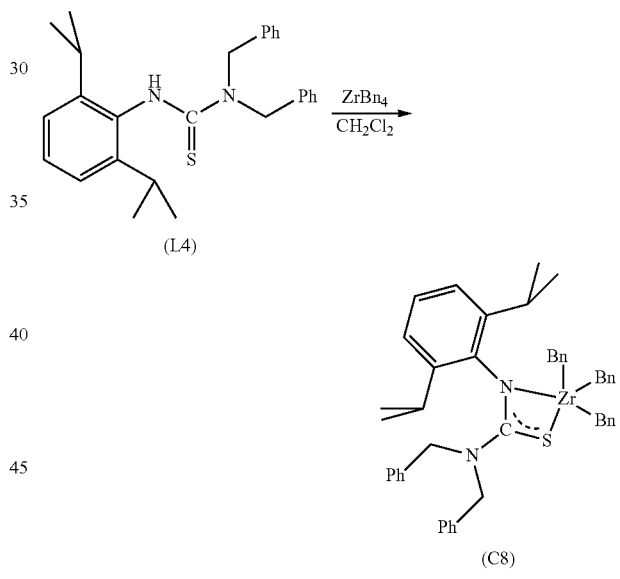

Catalyst C8 was prepared by dissolving in 5 mL of CH$_2$Cl$_2$ one molar equivalent of thiourea ligand L4 (0.050 g, 0.12 mmol) and mixing the resulting solution with one molar equivalent of ZrBn$_4$ (0.055 g, 0.12 mmol). After 10 min the solvent was removed under vacuum. The solids were further dried under high vacuum overnight to afford the product (catalyst C$_8$) in quantitative yield.

Catalyst C$_8$ was characterized by proton NMR and carbon-13 NMR as follows: $^1$H NMR (400 MHz, C$_6$D$_6$) δ 7.19 (t, J=7.7 Hz, 6H), 6.99 (m, 22H), 4.29 (br s, 4H), 3.15 (p, J=6.7 Hz, 2H), 2.21 (s, 6H), 1.23 (d, J=6.7 Hz, 6H), 0.70 (d, J=6.7 Hz, 6H). $^{13}$C NMR (101 MHz, C$_6$D$_6$) δ 176.66, 144.97, 143.16, 142.47, 136.23, 130.22, 130.02, 129.30, 127.09, 124.98, 124.00, 78.24, 29.20, 25.59, 24.85.

Example 15

Synthesis and Characterization of Catalyst C9

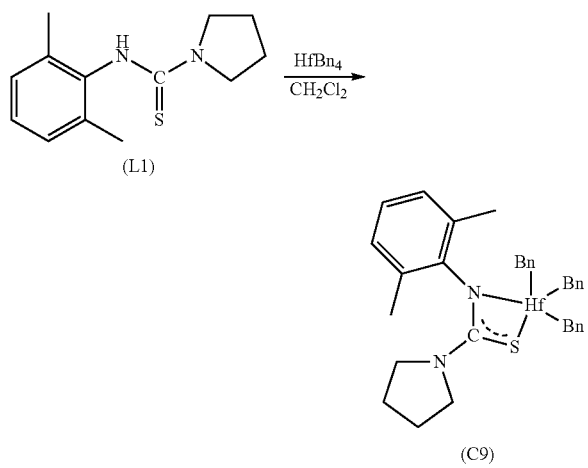

Catalyst C9 was prepared by dissolving in 5 mL of $CH_2Cl_2$ one molar equivalent of thiourea ligand L1 (0.050 g, 0.21 mmol) prepared according to Example 2 of this specification and mixing the resulting solution with one molar equivalent of $HfBn_4$ (0.116 g, 0.21 mmol). After 10 min the solvent was removed under vacuum and the product was dissolved in 5 mL of toluene, then mixed with 15 mL of hexane. The vial was cooled to −30° C. overnight. A large amount of solids formed. The solid material was isolated by filtration and dried under vacuum. The total yield of catalyst $C_9$ was 0.121 g (83%).

Catalyst $C_9$ was characterized by proton NMR and carbon-13 NMR as follows: $^1$H NMR (400 MHz, $C_6D_6$) δ 7.18 (t, J=7.7 Hz, 6H), 7.00 (d, J=7.3 Hz, 6H), 6.94 (t, J=7.3 Hz, 3H), 6.83 (m, 3H), 3.33 (br s, 2H), 2.26 (br s, 2H), 2.04 (s, 6H), 1.94 (s, 6H), 0.80 (br s, 4H). $^{13}$C NMR (101 MHz, $C_6D_6$) δ 170.87, 146.43, 142.90, 134.48, 134.41, 129.81, 129.65, 126.54, 123.68, 84.68, 19.84, 19.34.

Example 16

Synthesis and Characterization of Catalyst C10

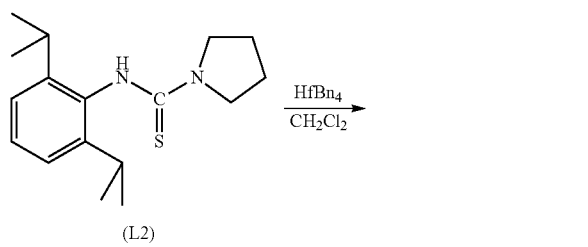

Catalyst C10 was prepared by dissolving in 5 mL of $CH_2Cl_2$ one molar equivalent of thiourea ligand L2 (0.050 g, 0.17 mmol) prepared according to Example 3 of this specification and mixing the resulting solution with one molar equivalent of $HfBn_4$ (0.093 g, 0.17 mmol). After 10 min the solvent was removed under vacuum. The product was dissolved in 5 mL of toluene and mixed with 15 mL of hexane. The vial then was cooled to −30° C. overnight. The resulting cloudy solution was passed through a 0.45-μm syringe filter, and the filtrate was evaporated to dryness under vacuum. The total yield of catalyst C10 was 0.122 g (96%).

Catalyst C10 was characterized by proton NMR and carbon-13 NMR as follows: 1H NMR (400 MHz, $C_6D_6$) δ 7.18 (t, J=7.7 Hz, 6H), 7.05 (d, J=7.2 Hz, 7H), 7.00 (s, 1H), 6.98 (d, J=1.8 Hz, 1H), 6.94 (t, J=7.3 Hz, 3H), 3.40 (br s, 2H), 3.18 (p, J=6.8 Hz, 2H), 2.42 (br s, 2H), 2.00 (s, 6H), 1.23 (d, J=6.8 Hz, 6H), 1.04 (d, J=6.8 Hz, 6H), 0.84 (br s, 4H). $^{13}$C NMR (101 MHz, $C_6D_6$) δ 171.38, 144.36, 143.89, 143.05, 129.83, 129.58, 127.68, 124.09, 123.68, 85.48, 29.61, 24.84, 24.15.

Example 17

Synthesis and Characterization of Catalyst C11

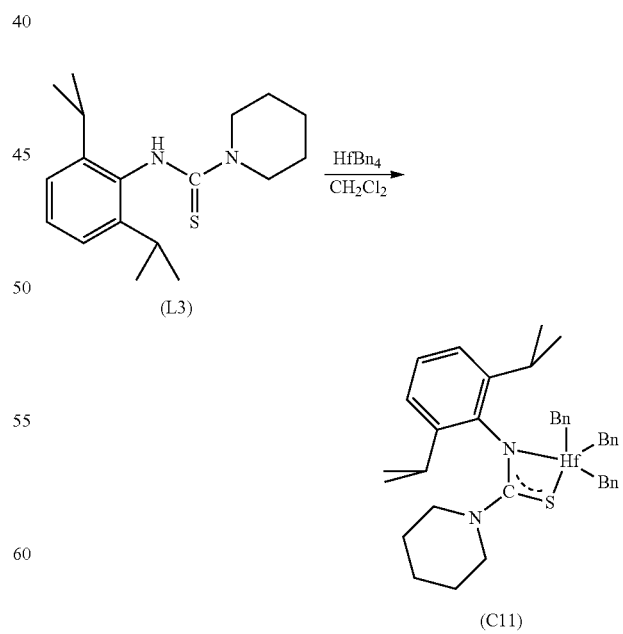

Catalyst C11 was prepared by dissolving in 5 mL of $CH_2Cl_2$ one molar equivalent of thiourea ligand L3 (0.050 g, 0.16 mmol) prepared according to Example 4 of this specification and mixing the resulting solution with one molar equivalent of HfBn$_4$ (0.089 g, 0.16 mmol). After 10 min the solvent was removed under vacuum. The product was dissolved in 5 mL of toluene and mixed with 15 mL of hexane. The vial then was cooled to −30° C. overnight. The resulting slightly cloudy solution was passed through a 0.45-μm syringe filter, and the filtrate was evaporated to dryness under vacuum. The total yield of catalyst C11 was 0.121 g (98%).

Catalyst C11 was characterized by proton NMR and carbon-13 NMR as follows: $^1$H NMR (400 MHz, C$_6$D$_6$) δ 7.17 (t, J=7.7 Hz, 6H), 7.03 (s, 6H), 7.01 (s, 3H), 6.93 (t, J=7.3 Hz, 3H), 3.08 (p, J=6.8 Hz, 2H), 2.95 (br s, 4H), 1.99 (s, 6H), 1.24 (d, J=6.8 Hz, 6H), 1.03 (d, J=6.8 Hz, 6H), 0.98 (m, 4H), 0.92 (m, 2H). $^{13}$C NMR (101 MHz, C$_6$D$_6$) δ 174.13, 144.41, 143.12, 129.79, 129.52, 127.38, 124.86, 123.67, 85.98, 50.02, 29.37, 26.53, 25.01, 24.72, 24.26.

Example 18

Synthesis and Characterization of Catalyst C12

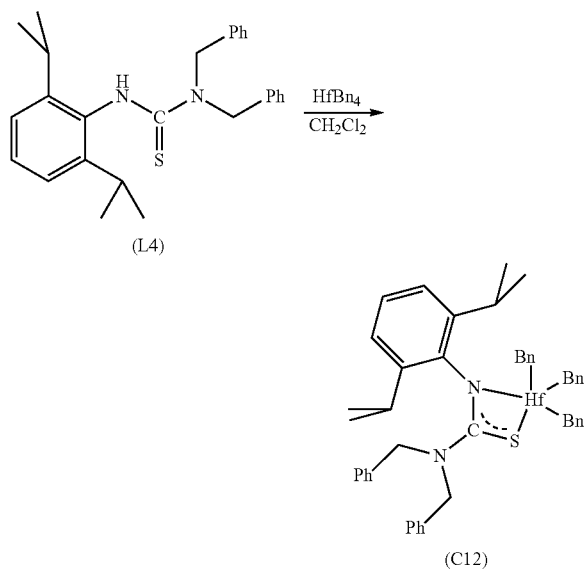

Catalyst C12 was prepared by dissolving in 5 mL of CH$_2$Cl$_2$ one molar equivalent of thiourea ligand L4 (0.060 g, 0.14 mmol) prepared according to Example 5 of this specification and mixing the resulting solution with one molar equivalent of HfBn$_4$ (0.078 g, 0.14 mmol). After 10 min the solvent was removed under vacuum. The product was dissolved in 5 mL of toluene and mixed with 15 mL of hexane. The vial then was cooled to −30° C. overnight. The resulting slightly cloudy solution was passed through a 0.45-μm syringe filter, and the filtrate was evaporated to dryness under vacuum. The total yield of catalyst C$_{12}$ was 0.123 g (99%).

Catalyst C$_{12}$ was characterized by proton NMR and carbon-13 NMR as follows: $^1$H NMR (400 MHz, C$_6$D$_6$) δ 7.22 (t, J=7.7 Hz, 6H), 6.99 (m, 22H), 4.69 (br s, 2H), 4.09 (br s, 2H), 3.07 (p, J=6.7 Hz, 2H), 2.05 (s, 6H), 1.23 (d, J=6.7 Hz, 6H), 0.65 (d, J=6.7 Hz, 6H). $^{13}$C NMR (101 MHz, C$_6$D$_6$) δ 175.50, 143.70, 143.41, 143.08, 135.89, 129.96, 129.67, 129.54, 129.35, 127.56, 126.04, 124.97, 123.78, 87.12, 29.28, 25.67, 24.74.

Example 19

Batch Copolymerization of Ethylene and 1-Octene

To determine the effectiveness of various catalysts according to embodiments of this specification, ethylene and 1-octene were batch copolymerized in the presence of catalysts C1, C2, C3, C5, C6, C7, and C8.

The copolymerizations were conducted in a 1 G Autoclave batch reactor designed for ethylene homopolymerizations and ethylene/α-olefin copolymerizations. The reactor was heated by electrical heating bands and cooled by an internal serpentine cooling coil containing chilled glycol. Both the reactor and the heating/cooling system were controlled and monitored by a Camile TG process computer. The bottom of the reactor was fitted with a dump valve that emptied the reactor contents into a glass dump pot for runs that were saved or to a plastic dump drum for waste. The dump pot was vented to the atmosphere with both the drum and glass kettle under a nitrogen purge. All chemicals used for polymerization or catalyst makeup (including solvents and monomers) were run through purification columns to remove any impurities that could affect the polymerization. High-pressure nitrogen and high-pressure hydrogen were ultra-high purity grade, supplied by Airgas.

The reactor was charged with Isopar E and 1-octene via independent Micromotion Flow Meters. The reactor was heated to the polymerization setpoint. Ethylene was added to the reactor at the reaction temperature to maintain the reaction pressure setpoint. Ethylene addition amounts were monitored by a Micromotion Flow Meter.

An MMAO-3A scavenger, an RIBS-II activator ([HNMe (C$_{18}$H$_{37}$)$_2$][B(C$_6$F$_5$)$_4$]), and a catalyst (one of catalysts C1, C2, C3, C5, C6, C7, or C8) were mixed with an appropriate amount of toluene in an inert-atmosphere glove box to achieve a desired molarity solution. The mixture was drawn into a syringe and transferred into the catalyst shot tank located outside the glove box. The mixture was added via high-pressure N$_2$ injection when the reactor pressure setpoint was achieved.

Immediately after catalyst addition, the run timer was started. Usually within the first minute of successful catalyst runs, an exotherm was observed, as well as decreasing reactor pressure. Then, ethylene was added by the Camile utilizing a Bronkhorst pressure controller to maintain the pressure setpoint in the reactor. The polymerizations were run for up to 10 minutes (or less than 10 minutes if a target ethylene uptake was observed), then the agitator was stopped and the bottom dump valve was opened to empty the reactor contents to the kettle. The kettle contents were poured into trays and placed in a lab hood, where the solvent was evaporated off overnight. The trays containing the remaining polymer were then transferred to a vacuum oven, where they were heated at 100° C. under vacuum to remove any remaining solvent. After the trays cooled to ambient temperature, the polymers were weighed for yields and efficiencies and were submitted for polymer testing.

Two runs of 10 minutes, one at 120° C. and another at 150° C., were conducted for each of the catalysts C1, C2, C3, C5, C6, C7, and C8. Pertinent data for each of the runs are provided in Table 1.

TABLE 1

Batch Polymerizations of Ethylene and 1-Octene Using Exemplary Catalysts

| Catalyst | Temp (° C.) | Catalyst Loading (μmol) | Poly (g) | Efficiency (kg poly/ g metal) | $M_w$ (kg/mol) | PDI | Octene Content (wt %) | Octene Content (mol %) | $T_m$ (° C.)* | $\Delta H_m$ (J/g)* |
|---|---|---|---|---|---|---|---|---|---|---|
| C1 | 120 | 2.00 | 8 | 44 | 101 | 4.7 | 15.1 | 4.3 | 113 | 132 |
|    | 150 | 4.50 | 12 | 29 | 43 | 3.9 | 18.4 | 5.3 | 117 | 112 |
| C2 | 120 | 3.00 | 3 | 11 | 151 | 15.7 | 21.1 | 6.3 | 117 | 116 |
|    | 150 |      |   |    |     | Inactive |   |   |   |   |
| C3 | 120 | 4.00 | 6 | 16 | 214 | 8.0 | 16.3 | 4.6 | 100 | 119 |
|    | 150 | 15.00 | 7 | 5 | 227 | 14.1 | 12.4 | 3.4 | 94 | 111 |
| C5 | 120 | 2.50 | 32 | 140 | 102 | 4.9 | 19.9 | 5.8 | 113 | 115 |
|    | 150 | 5.00 | 20 | 44 | 49 | 3.5 | 22.8 | 6.9 | 79 | 97 |
| C6 | 120 | 2.50 | 28 | 123 | 96 | 4.8 | 15.9 | 4.5 | 115 | 119 |
|    | 150 | 4.25 | 23 | 59 | 46 | 3.7 | 18.1 | 5.2 | 112 | 113 |
| C7 | 120 | 2.50 | 30 | 132 | 97 | 5.2 | 15.9 | 4.5 | 114 | 115 |
|    | 150 | 4.00 | 21 | 58 | 44 | 3.7 | 19.0 | 5.5 | 111 | 118 |
| C8 | 120 | 2.50 | 16 | 70 | 66 | 3.9 | 16.3 | 4.6 | 113 | 124 |
|    | 150 | 4.50 | 12 | 29 | 45 | 23.6 | 17.3 | 5.0 | 114 | 144 |

*DSC data pertaining to $T_m$ and $\Delta H_m$ are given for the second heat cycle
Polymerization conditions:
Activator [HNMe($C_{18}H_{37}$)$_2$][B($C_6F_5$)$_4$] (1.2 equiv); MMAO-3A (10 equiv).
Runs at Temperature = 120° C.: 1180 g of Isopar E; 570 g of 1-octene; no $H_2$; 280 psi of ethylene; 10 min run time.
Runs at Temperature = 150° C.: 1045 g of Isopar E; 570 g of 1-octene; no $H_2$; 317 psi of ethylene; 10 min run time.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A composition comprising at least one thiourea complex according to Formula (I):

$$MQ_aX_{4-a} \qquad (I)$$

where:
M is a metal center chosen from Ti, Zr, or Hf;
a is 1 or 2;
each group Q of the at least one thiourea complex is a bidentate thiourea ligand bound to the metal center, the thiourea ligand having Formula (Ia), Formula (Ib), or Formula (Ic):

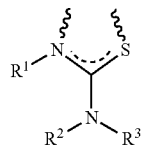
(Ia)

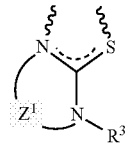
(Ib)

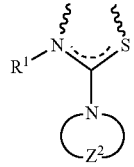
(Ic)

each group $R^1$, $R^2$, and $R^3$ in the at least one thiourea complex is independently chosen from alkyl groups or aryl groups;
each group $Z^1$ and $Z^2$ in the at least one thiourea complex is a divalent alkylene group;
if a=2, groups $R^1$ of the two groups Q are optionally linked to each other through at least one covalent bond, or groups $R^3$ of the two groups Q are optionally linked to each other through at least one covalent bond; and
each X is covalently bonded or coordinated to the metal center and is independently chosen from alkyl groups, halides, or amides.

2. The composition of claim 1, wherein:
a is 1; and
the at least one thiourea complex has Formula (IIa), Formula (IIb), or Formula (IIc):

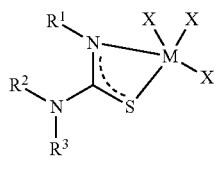
(IIa)

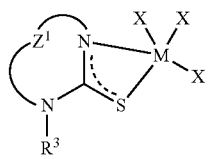
(IIb)

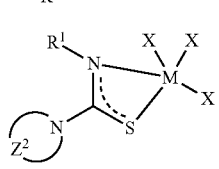
(IIc)

where M, $R^1$, $R^2$, $R^3$, $Z^1$, $Z^2$, and X are as defined in Formula (I).

3. The composition of claim 2, wherein $R^1$ is a substituted phenyl group or a cycloalkyl group.

4. The composition of claim 2, wherein each $R^1$ is

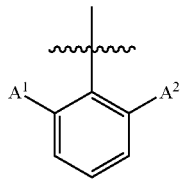

where $A^1$ and $A^2$ are independently a ($C_1$-$C_{10}$) alkyl group.

5. The composition of claim 4, wherein $A^1$ and $A^2$ are independently chosen from methyl; ethyl; propyl; 1-methylethyl; 1,1-dimethylethyl; or butyl.

6. The composition of claim 2, wherein the at least one thiourea complex has Formula (IIa), where $R^2$ and $R^3$ are independently —$(CH_2)_n$Ph groups, where n is from 0 to 5.

7. The composition of claim 2, wherein the at least one thiourea complex has Formula (IIc), where $Z^2$ is a $C_4$ to $C_{10}$ alkylene group.

8. The composition of claim 2, wherein the at least one thiourea complex is chosen from compounds C5, C6, C7, C8, C9, C10, C11, C12, or combinations thereof:

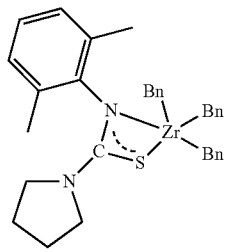
(C5)

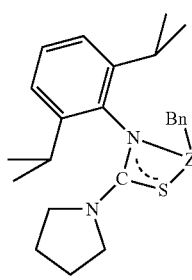
(C6)

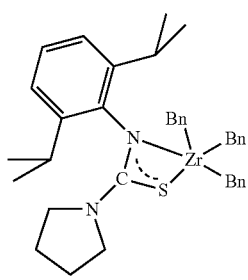
(C7)

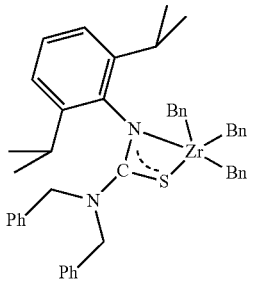
(C8)

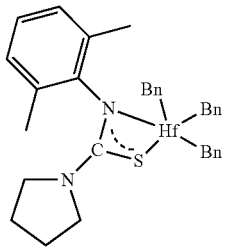
(C9)

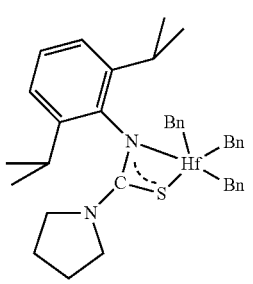
(C10)

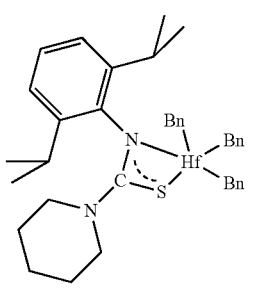
(C11)

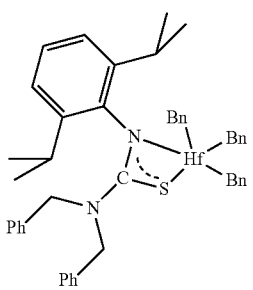
(C12)

wherein Bn in each of compounds C5, C6, C7, C8, C9, C10, C11, and C12 is benzyl.

9. The composition of claim 1, wherein:

a is 2; and the at least one thiourea complex has Formula (IIIa), Formula (IIIb), Formula (IIIc), Formula (IIId), Formula (IIIe), or Formula (IIIf):

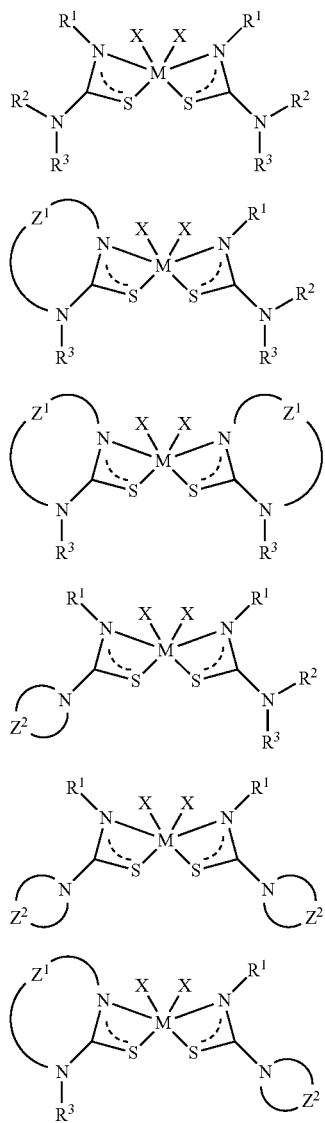

where M, $R^1$, $R^2$, $R^3$, $Z^1$, $Z^2$, and X are as defined in Formula (I).

10. The composition of claim 9, wherein the at least one thiourea complex has Formula (IIId), Formula (IIIe), or Formula (IIIf); and $Z^2$ is a $(C_4$-$C_{10})$alkylene group.

11. The composition of claim 10, wherein $Z^2$ is a $(C_4$-$C_5)$ alkylene group.

12. The composition of claim 10, wherein:
$Z^2$ is —$(CH_2)_4$— or —$(CH_2)_5$—; and
$R^1$ is cyclohexyl or

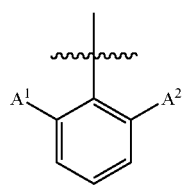

where $A^1$ and $A^2$ are independently a $(C_1$-$C_{10})$ alkyl group.

13. The composition of claim 9, wherein the at least one thiourea complex is chosen from compounds C1, C2, C3, C4, or combinations thereof:

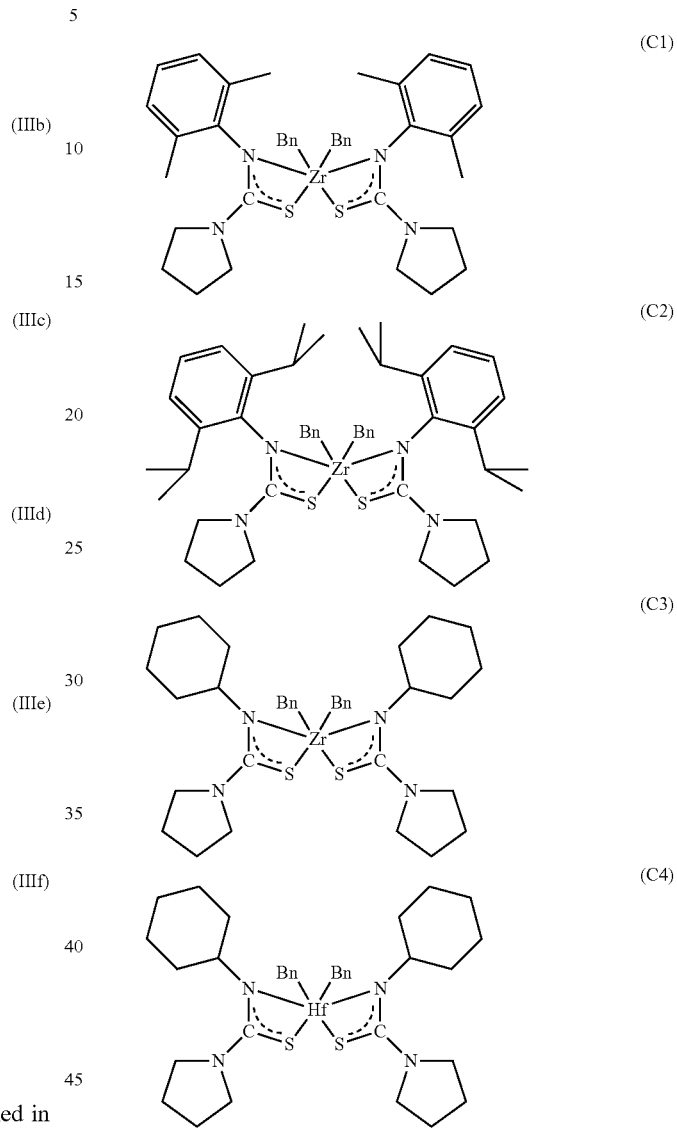

wherein Bn in each of compounds C1, C2, C3, and C4 is benzyl.

14. The composition of claim 1, wherein:
a is 2;
groups $R^1$ of the two groups Q are linked to each other as a bridging group $Z^3$; and
the at least one thiourea complex has Formula (IVa), Formula (IVb), or Formula (IVc):

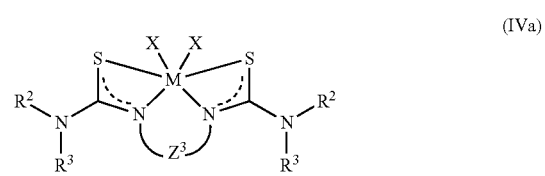

-continued

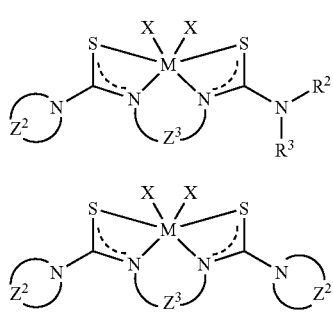

(IVb)

(IVc)

where:
M, $R^1$, $R^2$, $R^3$, $Z^1$, $Z^2$, and X are as defined in Formula (I); and
$Z^3$ is an alkylene group.

15. The composition of claim 14, wherein $Z^3$ is a ($C_3$-$C_{40}$) alkylene group.

16. The composition of claim 1, wherein:
a is 2;
groups $R^3$ of the two groups Q are linked to each other as a bridging group $Z^4$; and
the at least one thiourea complex has Formula (Va), Formula (Vb), or Formula (Vc):

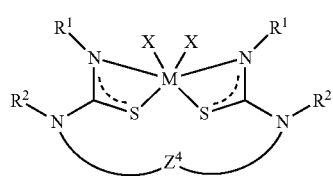

(Va)

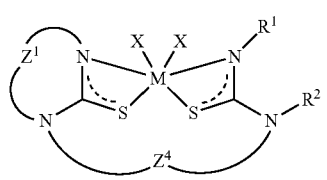

(Vb)

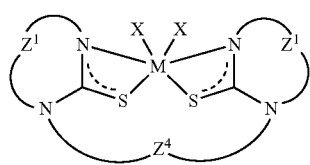

(Vc)

where:
M, $R^1$, $R^2$, $Z^1$, and X are as defined in Formula (I); and
$Z^4$ is an alkylene group.

17. The composition of claim 16, wherein $Z^4$ is a ($C_3$-$C_{40}$) alkylene group.

18. A polymerization method comprising:
reacting ethylene and an α-olefin comonomer in the presence of a catalytic amount of the composition of claim 1 to form an ethylene-co-alkylene copolymer, wherein the α-olefin comonomer comprises at least one $C_3$-$C_{12}$ α-olefin.

19. The polymerization method of claim 18, wherein the composition comprises at least one thiourea complex chosen from compounds of Formula C1, C2, C3, C4, C5, C6, C7, or combinations thereof:

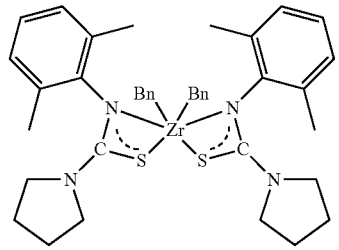

(C1)

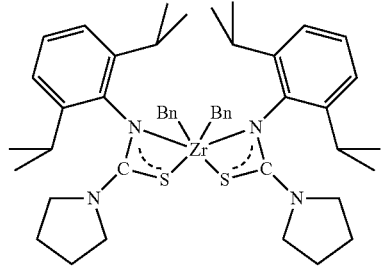

(C2)

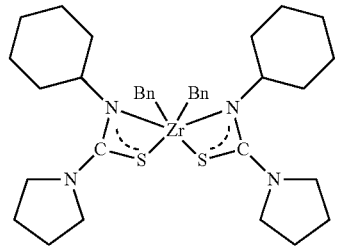

(C3)

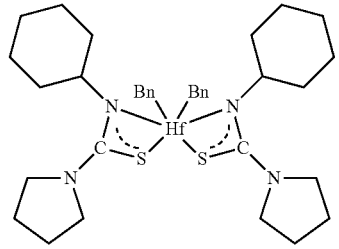

(C4)

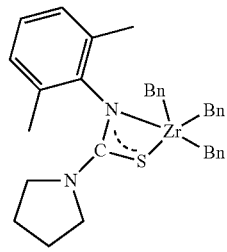

(C5)

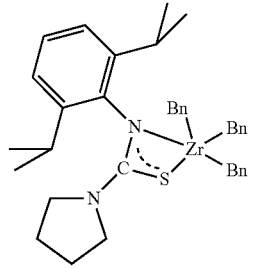

(C6)

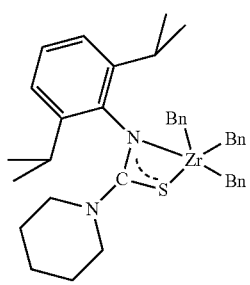
(C7)
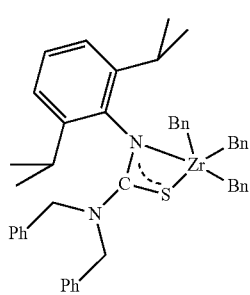
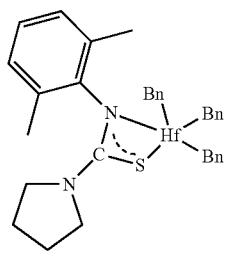
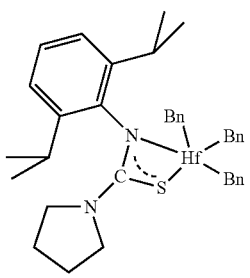
(C10)
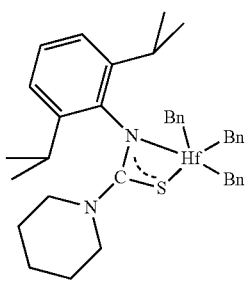
(C11)
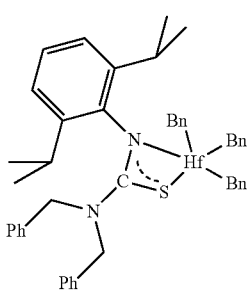
(C12)
wherein Bn in each of compounds C1, C2, C3, C4, C5, C6, and C7 is benzyl.
20. The polymerization method of claim 18, wherein the α-olefin comonomer is 1-octene.
\* \* \* \* \*